(12) United States Patent
Rolf et al.

(10) Patent No.: US 7,917,402 B2
(45) Date of Patent: Mar. 29, 2011

(54) METHODS FOR VIRAL MARKETING WITH VISUAL COMMUNICATIONS

(75) Inventors: Devon A. Rolf, Paola, KS (US); Jonathan C. Burrell, Spring Hill, KS (US)

(73) Assignee: GoFiniti, LLC, Paola, KS (US)

( * ) Notice: Subject to any disclaimer, the term of this patent is extended or adjusted under 35 U.S.C. 154(b) by 1327 days.

(21) Appl. No.: 11/375,821

(22) Filed: Mar. 15, 2006

(65) Prior Publication Data
US 2007/0219871 A1    Sep. 20, 2007

(51) Int. Cl.
*G06Q 30/00* (2006.01)
(52) U.S. Cl. ............... 705/26.1; 705/27.1; 705/14.1; 705/14.16; 705/14.17; 705/14.23
(58) Field of Classification Search .............. 705/14.1, 705/14.17, 26, 27, 14.16, 14.23, 26.1, 27.1
See application file for complete search history.

(56) References Cited

U.S. PATENT DOCUMENTS

| | | | |
|---|---|---|---|
| 5,475,833 A | 12/1995 | Dauerer et al. | 707/201 |
| 5,537,314 A | 7/1996 | Kanter | 705/14 |
| 5,555,191 A | 9/1996 | Hripcsak | 709/224 |
| 5,712,979 A | 1/1998 | Graber et al. | 709/224 |
| 5,717,860 A | 2/1998 | Graber et al. | 709/227 |
| 5,812,769 A | 9/1998 | Graber et al. | 709/228 |
| 5,819,285 A | 10/1998 | Damico et al. | 707/104.1 |
| 5,937,390 A | 8/1999 | Hyodo | 705/14 |
| 5,960,409 A | 9/1999 | Wexler | 705/14 |
| 5,991,740 A | 11/1999 | Messer | 705/27 |
| 6,029,141 A | 2/2000 | Bezos et al. | 705/27 |
| 6,049,778 A | 4/2000 | Walker et al. | 705/14 |
| 6,092,102 A | 7/2000 | Wagner | 340/7.29 |
| 6,115,690 A | 9/2000 | Wong | 705/7 |
| 6,266,654 B1 | 7/2001 | Schull | 705/58 |
| 6,334,111 B1 | 12/2001 | Carrott | 705/14 |
| 6,343,275 B1 | 1/2002 | Wong | 705/26 |
| 6,446,044 B1 | 9/2002 | Luth et al. | 705/14 |
| 6,460,072 B1 * | 10/2002 | Arnold et al. | 709/203 |
| 6,553,403 B1 | 4/2003 | Jarriel et al. | 709/202 |
| 6,578,010 B1 | 6/2003 | Teacherson | 705/14 |
| 6,658,454 B1 | 12/2003 | Delany et al. | 709/202 |

(Continued)

OTHER PUBLICATIONS

"Technology Briefing: Internet; 'Mall' Operator Settles Charges," Mar. 28, 2001; New York Times, Late Edition—Final ED, col. 3, p. 4, 1pp.*

*Primary Examiner* — Adam Levine
(74) *Attorney, Agent, or Firm* — Hovey Williams LLP

(57) ABSTRACT

A method for developing a direct person-to-person multilevel direct affiliate marketing network using electronic communications makes a first person an affiliate member of an affiliate marketing program via an online registration process. An electronic communication is generated that has a unique hyperlink that, when selected, links to a source associated with the affiliate marketing program and identifies the first person so that a commission can be allocated to the first person based upon purchases made at the source as a result of access to the source via the link. The first person can forward the electronic communication to others who can use the link to access the source and purchase products or services and/or become an affiliate member. A person that becomes a new affiliate member as a result of accessing the source via the link is placed in a developing network organization of the first person. The process repeats by generating a unique hyperlink for the second person, thereby allowing the new affiliate member to forward electronic communications having his or her unique identifying link to others.

35 Claims, 12 Drawing Sheets

U.S. PATENT DOCUMENTS

| | | |
|---|---|---|
| 6,662,212 B1 | 12/2003 | Chandhok et al. ............ 709/206 |
| 6,947,897 B2 | 9/2005 | Lortscher et al. ............... 705/14 |
| 6,957,220 B2 | 10/2005 | Lamkin et al. ................ 707/100 |
| 6,980,962 B1 * | 12/2005 | Arganbright et al. .......... 705/26 |
| 6,993,489 B1 | 1/2006 | Miglautsch ...................... 705/1 |
| 7,089,208 B1 | 8/2006 | Levchin et al. |
| 7,104,443 B1 | 9/2006 | Paul et al. |
| 7,856,387 B1 | 12/2010 | Rolf |

\* cited by examiner

| NAME | ID | SPONSOR | USERNAME | ADDRESS | TELEPHONE | ACCOUNT |
|---|---|---|---|---|---|---|
| JON DOE | P1 | SOURCE | JD | 123 ANY... | 555.555.5555 | PAYPAL XYZT |
| JANE MAY | P2 | P1 | JANE | 456 SOME... | | |
| DON KIM | P4 | P1 | D342 | | | |
| BOB LIN | P5 | P2 | WINLIN | | | |
| | P6 | P2 | | | | |
| | P8 | P4 | | | | |
| | P10 | P4 | | | | |
| | P16 | P10 | | | | |
| | P19 | P10 | | | | |
| | P24 | P19 | | | | |
| | P25 | P24 | | | | |
| | P26 | P25 | | | | |
| | P27 | P26 | | | | | http://www.goFiniti.com http://www.P1.goFiniti.com http://www.P2.goFiniti.com http://www.goFiniti.com/am/P1 http://www.goFiniti.com/am/P2

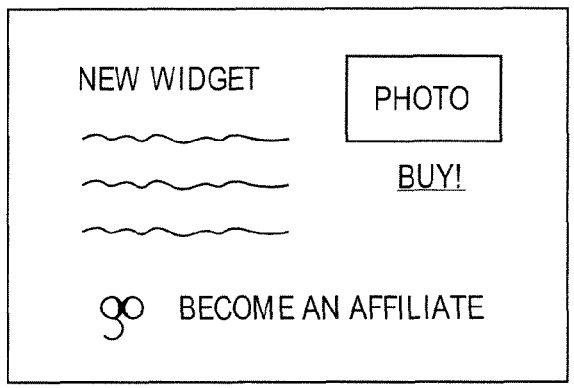
SCREEN 1
SCREEN 2
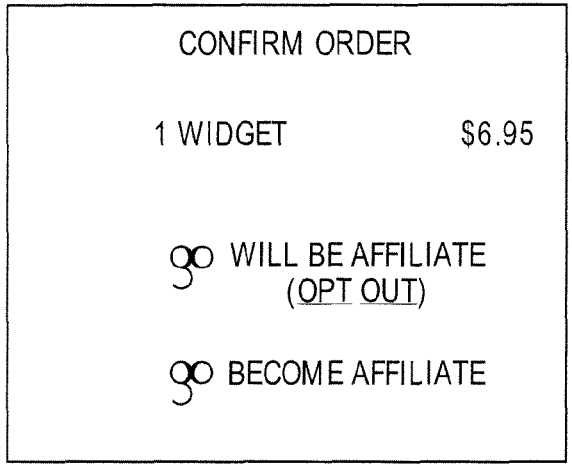
SCREEN 3
FIG. 7

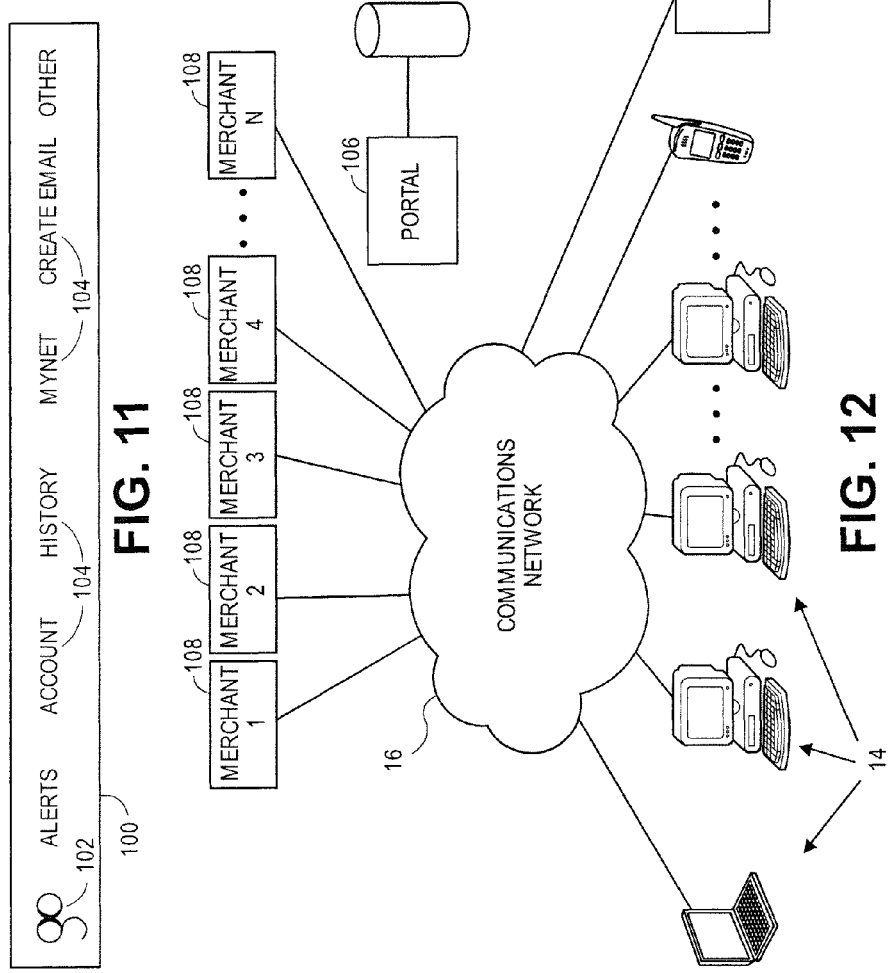

∞Finiti.com        ∞ become affiliate

[COUPON]        [SEARCH!]

MERCHANTS PARTICIPATING         PRODUCT/SERVICE/
                                CONTENT CATEGORIES
SELECT
                                GOODS
☐   MERCHANT                        ☐   HOUSEWARES
☐   MERCHANT                        ☐   LAWN AND GARDEN
                                    ☐   CLOTHING/APPAREL
☐   MERCHANT                        ☐   AUTO SUPPLIES
                                    ☐   HEALTH/BEAUTY
    •
    •
    •                               ☐   MUSIC/MUSIC
    •                                   INSTRUMENTS
☐   MERCHANT
                                    ☐   COMPUTERS
                                SERVICES
                                    ☐   WEB DESIGN/HOSTING
                                    ☐   GRAPHIC ARTS
                                        •
                                        •
☐   SELECT ALL                      ☐   VOIP
                                CONTENT
                                    ☐   ARTWORK
                                    ☐   MEDIA
                                    ☐   BOOKS

FIG. 15

ENTER ACCESS CODE

METHODS FOR VIRAL MARKETING WITH VISUAL COMMUNICATIONS

BACKGROUND OF THE INVENTION

Field of the Invention

The present invention is generally directed to a multilevel affiliate marketing program. More specifically, the present invention is directed to a system, method and tool for developing a multilevel direct affiliate marketing network using electronic communications.

SUMMARY OF THE INVENTION

The system and method of the present invention provides a multilevel electronic marketing tool. In accordance with the invention, a person can become an affiliate marketing member in a direct multi-level affiliate marketing program provided by a merchant source of goods, content or services. Preferably, the person becomes an affiliate by entering identifying information at an online web page associated with the source. After becoming an affiliate member, an electronic communication (such as an e-mail) is sent to the affiliate. The e-mail preferably includes information about the source or goods, content, or services offered by the source and which are available for purchase at the source. Additionally, the e-mail preferably includes a link, such as a hyperlink, to the source. Additionally, the electronic communication preferably includes information about the opportunity to become an affiliate member.

In accordance with the invention, the electronic communication to the affiliate member is encoded with an identifier that is unique to the affiliate member. Preferably, this is accomplished by encoding the link to the source provided in the e-mail with an electronic identifier that identifies the affiliate member. Upon receipt of the electronic communication, the affiliate member electronically forwards the electronic communication to others. An individual that receives the forwarded electronic communication may utilize the link to access the source (typically accomplished by clicking on the link using a mouse to navigate with a browser program to the associated web-page or document) and purchase goods, content or services offered by the source. In accordance with the invention, the affiliate member is allocated a commission for the purchase.

Additionally, recipients of the forwarded e-mail may choose to forward the e-mail to others. Additional recipients of the forwarded e-mail, no matter how far down the chain from the original e-mail sent by the affiliate member, may access the source via the link provided in the forwarded e-mail, and make purchases at the source. The system and method of the present invention allocate a commission to the affiliate member for those purchases resulting from the forwarded e-mail chain containing the link to the source that is associated with the affiliate member.

The system and method of the invention also provide the ability for recipients of the forwarded e-mail to become an affiliate member. When a recipient of the forwarded e-mail chooses to become an affiliate member, he or she (or the entity) registers online by entering identifying information. The new affiliate member is electronically associated with the original affiliate member, that is the source of the e-mail, using the unique link provided in the electronic communication. In particular, the original affiliate member is considered a direct sponsor of the new affiliate member, such that the new affiliate member is considered to be on a first level of a direct marketing or affiliate organization of the original affiliate member.

In accordance with the invention, upon becoming an affiliate member, a new electronic communication is sent to the new affiliate member, and the process begins again. In particular, the new electronic communication contains a unique identifier of the new affiliate member, such that recipients of the new e-mail (whether they be direct recipients of the e-mail from the new affiliate member, or subsequent recipients down a chain of forwarded e-mails) may access the source via the link embedded in an electronic communication and make purchases at the source. In accordance with the invention, such purchases will result in allocations of commissions to the new affiliate member, as well as allocations of commissions to the original sponsoring affiliate member, according to a defined multilevel commission structure. Additionally, recipients of an e-mail containing the new affiliate member's identifier may also opt to become an affiliate member, in which case the new affiliate member would become a direct sponsor and the original affiliate member would become an indirect sponsor. In other words, in such a situation, a second-level of the direct marketing or affiliate organization of the original affiliate member is developed by development of a first level of the direct marketing or affiliate organization of the new affiliate member. In a variation of the invention, the source may send a first welcome email with instructions and other information and a second email with the uniquely identifying link that is adapted for forwarding to others as part of the marketing effort and the effort to build a multilevel organization of independent affiliates.

In an alternate embodiment of the present invention, upon becoming a new affiliate member, the new affiliate member is prompted to go to or is directed to a page on a website of the source at which the new affiliate member can select a pre-developed electronic communication or can create an electronic communication that will include the new affiliate member's identifying link. The selected or created electronic communication can then be sent to an electronic address of the new affiliate member for subsequent forwarding by the new affiliate member or can be sent to others directly from the source site using, for example, a web-based email program. For example, the new affiliate member could be automatically directed to such a page after completing a registration process or could be prompted to go to such a page. Alternatively, the source of the affiliate marketing program may send a welcome email to the new affiliate member with instructions and a link back to such a page at which an electronic communication may be selected or created. In a variation, the source may send a welcome email with a link back to a webpage at the source at which a web-based email program is used to send an electronic communication containing the identifying link of the affiliate member to others.

In accordance with the invention, the source pays commissions to each affiliate for purchases made in his, her or the entity's affiliate organization down through a certain level. The system and method of the present invention may be structured to allocate different commission percentages on purchases made at different levels of the affiliate member's direct marketing affiliate organization. Additionally, the system and method of the present invention may require that certain criteria are first met before a commission is allocated. As an example, the system and method of the present invention may require that an affiliate member have a minimum required number of directly sponsored affiliate members before a commission is paid. Additionally, for example, the system and method of the present invention may require a certain minimum volume of purchase activity within an affiliate member's direct affiliate organization during a selected time period before a commission is paid.

In accordance with an additional aspect of the invention, a purchaser who makes a purchase at said source may automatically become an affiliate member. Alternatively, the system and method may provide the ability for someone accessing the source via a link in a forwarded e-mail to opt-in to becoming an affiliate member or, alternatively, to opt-out of becoming an affiliate member.

In accordance with an additional aspect of the invention, an electronic communication sent in accordance with the principles of the present invention may include a unique logo, symbol or other identifier that is or becomes readily identifiable as indicative of the opportunity to become an affiliate member.

In accordance with yet an additional aspect of the invention, the source may provide electronic templates of electronic communications (such as emails) that may be edited or tailored by an affiliate member. Accordingly, for example, a source that offers a variety of products may offer templates that focus on different products or different product lines. A particular affiliate member may select a particular template for electronic communication and, in one embodiment, create a customized electronic communication by adding to the template text, graphics, images and/or audio and/or video content that is personalized by the affiliate member or selected from provided menu items.

In accordance with yet an additional aspect of the present invention, each affiliate member is provided his or her own web page. Access to the source via a link in an electronic communication sent by an affiliate member, that includes the stated unique identifier tag identifying the affiliate member, results in access at the source at the particular web page associated with the affiliate member. Access to such a page may (but need not) just capture the unique identifier and then immediately and automatically redirect the access to a home page or other page of the source website.

Preferably, the process of becoming an affiliate member involves a person accessing a website and entering identifying information such as his or her name, address, telephone number, and e-mail address. In one embodiment of the invention, commissions due to an affiliate member are paid by writing and sending a check for the commissions to the physical address of the user. Such commission checks could be paid with any desired frequency, such as monthly, quarterly, semi-annually, annually, etc., but are preferably paid monthly or quarterly. In accordance with an alternative aspect of the invention, a person desiring to become an affiliate member may use information associated with an anonymous payment account, such as those provided by PayPal, thus enabling the person to become an affiliate member without actually divulging his or her personal identity to the source or sponsor of the affiliate marketing program. In such an embodiment, accumulated commission payments due to an affiliate member may be deposited into the payment account for retrieval by the affiliate member associated with the account. Again, such deposits are preferably made on a periodic basis with each deposit corresponding to a just-completed time period, although commission deposits could be made at the time of each purchase. The payment account, which is stored on a server associated with the source of the affiliate program, on the server of a gateway organization that is managing the marketing program, or on a server associated with a payment entity (such as PayPal), can also be used by its owner to pay for purchases made at the source. Indeed, one aspect of the invention itself includes a payment account feature, such that the system of the present invention supports provision of a payment account that is offered by the source. Accordingly, a user could use a third party payment account (such as PayPal or a Google Payment account) or could sign up for a similar account that is offered by the source.

In accordance with the invention, electronic communications, such as e-mail communications, providing information about the source or its products and/or services are periodically sent to all affiliate members. These communications are encoded so that an e-mail received by a particular affiliate member will include his or her identification code or tag. Doing so provides the affiliate membership with periodic communications that can be forwarded to others to stimulate commerce with the source. Additionally, electronic communications in such a campaign may also be sent to prior customers of the source who are not affiliate members. In one embodiment, such prior customers make a choice to opt-in or opt-out of such e-mail solicitations the first time the customer visits the source site or makes a purchase at the source. Preferably, such electronic communications to prior customers also include the identifying link of the affiliate member associated with the customer from a prior purchase. However, prior customers may remain associated with an affiliate member via a database link, such that any purchase of the customer, whether resulting from an access to source 12 via a uniquely encoded link or not, results in a commission allocation.

As an additional feature of the present invention, a physical catalogue featuring products and/or services of the source may be sent to physical addresses of affiliate members and prior customers. Each catalogue is coded with an identifying code of an affiliate member. In particular, a prior customer receives a catalogue that is coded with the affiliate member with which that customer is associated based upon a prior transaction at the source. The customer may place a purchase order for a product or service by accessing the website of the source or by calling a telephone call center associated with the source and providing the identification code printed on the catalogue. Doing so will cause commissions for the purchase to be allocated, to affiliate members in the network of the affiliate member associated with the identification code, according to a defined multilevel commission structure.

The present invention does not require use of cookies that are placed on the computing terminal of a potential purchaser or an affiliate member. However, the invention may also employ use of cookies deposited on computing terminals that are used to access the online source as an additional way to identify individuals that return to the source.

The present invention also provides analytical tools for evaluating data related to a number of hits to a source site, a number of page hits, time spent on the site, the timeliness of hits to the source site relative to the sending of an electronic communications marketing campaign, volume and dollar amount of purchases relative to such a campaign and as compared with other campaigns, and other information obtained from data indicative of the electronic communication(s) and the response thereto.

Additionally, while preferred embodiments of the present invention involve automatically populating an electronic communication with a unique link that identifies a specific affiliate member, an affiliate member may also manually type or paste his, her or its associated link into an electronic communication that is sent to others. Additionally, while one primary embodiment of the present invention employs electronic communications that are emails (which includes attachments to emails having a link therein), it should be understood that other electronic communications or content may be employed by the present invention, such as web-pages of any and all types, online blogs, instant messages (IM), chat features, or on a page displayed during output of an online broadcast audio or video stream or a streaming or downloaded audio or video recording.

BRIEF DESCRIPTION OF THE DRAWINGS

FIG. 5 depicts examples of unique electronic links generated and used by the present invention;

FIG. 7 depicts an example of web-pages displayed by a system of the present invention;

FIG. 11 depicts an electronic toolbar of the present invention;

FIG. 12 depicts an alternate embodiment of a system employed by the present invention;

FIG. 15 depicts a web-page associated with the embodiment of FIGS. 12 and 13; and FIG. 16 depicts an anti-script feature of the invention.

DETAILED DESCRIPTION OF THE INVENTION

Figure 1:
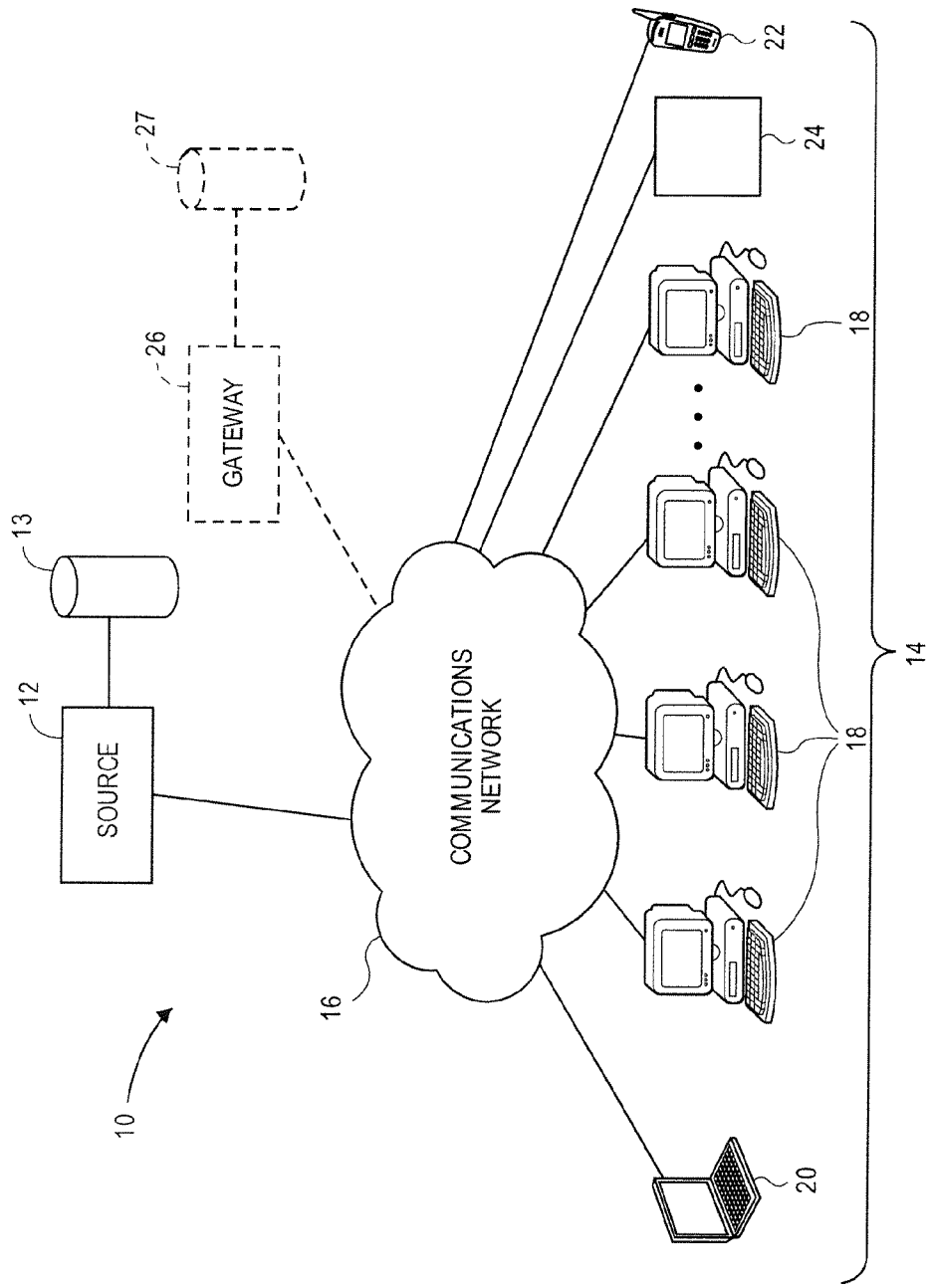
FIG. 1 depicts a system employed by the present invention.

With reference to FIG. 1, a system used by the present invention is denoted generally by the reference numeral 10. System 10 has a source 12 having or in communication with a database 13. Source 12 is a source that offers goods, services, and/or digital content or media. Source 12 provides subject matter for review digitally in an online manner, such as at a website that is accessible by communications devices 14 via a communications network 16. Communications devices 14 may be of a variety of types including personal computers 18, laptop computers 20, mobile wireless devices 22, including cellular telephones, or other types of communications devices, such as interactive televisions or computing-based media systems connected to a network, as represented by block 24.

Communications devices 14 communicate with source 12 via communications network 16. Communications network 16 is preferably a global communications network and is intended to encompass any and/or all types of communications networks including wide area networks and local area networks and combinations thereof employing wire, cable, fiber-optic, wireless, and/or other technologies. In particular, communications network 16 may include, without limitation, any form of telecommunications network. Communications network may include, but is not limited to cellular networks, satellite networks, WiFi and/or WiMax hotspots, nodes, and/or networks, etc. It should be understood that communications network 16 may use a wide variety of protocols, including Internet protocols, which is a collection of interconnected networks that are linked together by a set of standard protocols (such as TCP/IP and HTTP) to form a global, distributed network. It should also be understood that the present invention contemplates and covers networks and protocols developed, refined and/or advanced in the future, including but not limited to Internet2, or UCAID (University Corporation for Advanced Internet Development).

Online source 12 has a website that is accessible at an electronic address on communications network 16 and is preferably accessible via the worldwide web at a Uniform Resource Locator (URL). As will be appreciated, source 12 may offer goods, services, and/or content exclusively online, or may also offer goods via other distribution channels, such as retail and wholesale outlet stores, physical catalogs, etc. As will also be appreciated, system 10 will employ one or more host servers that may be owned and operated by the source 12 or by another entity that has a relationship with source 12.

In accordance with the present invention, source 12 provides an affiliate marketing program that includes an opportunity for persons (including entities) to become an affiliate member and develop a direct multi-level affiliate marketing organization. In one embodiment of the invention, source 12 manages the affiliate marketing program itself and provides the tools and/or resources necessary to the program. In an alternate embodiment, a separate entity operates a gateway, such as gateway 26 having (or in communication with) a database 27 shown in FIG. 1, that manages the affiliate marketing program for source 12 and also may manage other multi-level affiliate marketing programs for entities or companies other than source 12.

Figure 2:
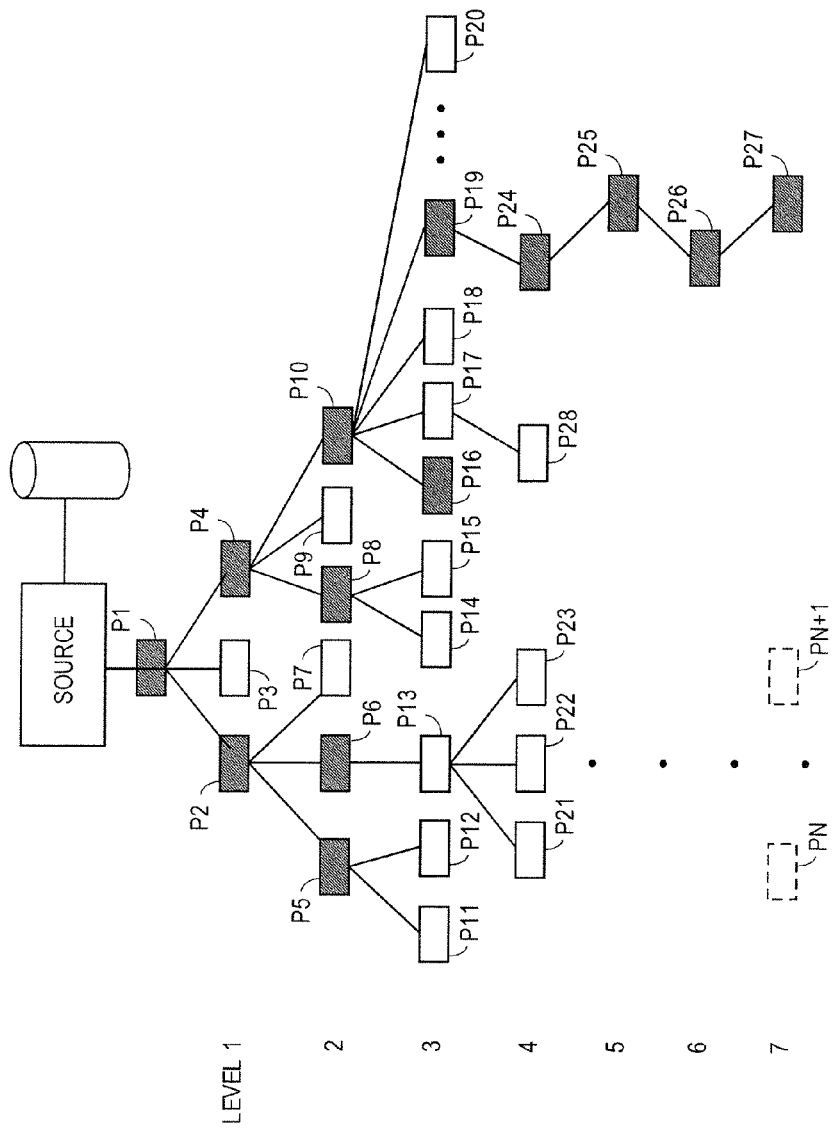
FIG. 2 depicts an example of a direct affiliate marketing network developed in accordance with the present invention.

With reference now to FIG. 2, the affiliate marketing program of the present invention is illustrated and described.

FIG. 2 depicts a direct multilevel affiliate marketing network or organization of independent affiliate members that has been developed in accordance with the principles of the present invention. Source 12 offers the inventive direct affiliate marketing program and opportunity. Solid blocks 28 represent persons (i.e., individuals or entities) that have become affiliate members of the direct affiliate marketing program. Affiliate members are also likely customers of source 12. Open blocks 30 represent persons (i.e., individuals or entities) that have been a customer of source 12 but who are not affiliate members.

In accordance with the invention, a first person P1 may become an affiliate member of the affiliate marketing program associated with source 12. Person P1 is an individual or an entity, but is likely most often to be an individual. Person P1 becomes an affiliate member by accessing source 12 (or gateway 26) and choosing to become an affiliate member and entering identifying information (as discussed further in conjunction with FIG. 7). Person P1 may become an affiliate member by accessing source 12 (or gateway 26) after seeing or hearing information about the offering. In particular, for example, person P1 may direct a browser program in a communications device 14 to a website of source 12 or gateway 26 by typing or pasting a URL into a browser field or by selecting a link provided in an advertisement or in a search result. In such a case, person P1 may be placed at the top of a new branch of the affiliate marketing network, may be randomly assigned to a position with the affiliate marketing network by a random position generator, or may be placed directly beneath another affiliate member based upon some identifying criteria (such as the person P1 accessing affiliate member profiles and selecting a position within the network, or person P1 selecting an affiliate member who communicated the opportunity to person P1, or person P1 being automatically matched with another affiliate member based upon criteria such as closet physical address, etc.).

Alternatively, in accordance with an aspect of the invention, person P1 becomes an affiliate member in the following manner. Person P1 receives an electronic communication from source 12 or gateway 26 at a communications device 14 associated with person P1. The electronic communication is preferably in the form of electronic mail (email) with or without attachments such that the electronic communication includes, alone or in combination, text, graphics, images, audio, and video. In a typical embodiment, the electronic communication is an email that includes information about source 12 and/or one or more goods, services or content offerings of source 12. The electronic communication may be a text email or an email newsletter (such as an email with html encoded or combined text/html encoding) that further includes at least some graphics or images to enhance the communication, although this is not necessary. Graphics, images, and other content (such as audio) may be embedded in the email communication or may be provided as links in the email such that graphics, images and/or other content is accessed from a site of the source 12 or gateway 26 upon opening of the email. Additionally, the electronic communication includes an indication of the opportunity to become an affiliate member of the direct multi-level affiliate marketing program offered by source 12. This indication is preferably in the form of a short written statement that presents or at least references the opportunity to become an affiliate member, but could also be just a logo, symbol, icon or other mark that, through advertising and/or the development of goodwill, has become known to represent such a unique affiliate marketing opportunity.

The electronic communication sent to person P1 also includes a link back to a source associated with the affiliate marketing program (i.e., source 12 or gateway 26). As illustrated, person P1 is at the top of the multi-level affiliate marketing network comprised of affiliate members 28. Accordingly, as illustrated, person P1 received the electronic communication directly from a source associated with the affiliate marketing program (i.e., source 12 or gateway 26). In that regard, source 12 can initiate its direct affiliate marketing program by sending electronic communications, such as emails, to only person P1 or, preferably (but not shown), to a large number of people in a simultaneous or substantially simultaneous effort to develop multiple branches of the affiliate marketing network.

Upon receipt of the electronic communication, person P1 may become an affiliate member by accessing the source associated with the affiliate marketing program (such as source 12 or gateway 26) via the link provided in the electronic communication and entering identifying information to become an affiliate member. In this regard, entry of the identifying information may be solely for the purpose of becoming an affiliate member, or entry of the identifying information may be part of a purchase of goods, services and/or content made by person P1 at source 12. In accordance with one embodiment of the invention, a person (such as person P1) who accesses source 12 automatically becomes an affiliate member upon making a purchase. Alternatively, system 10 is set-up to automatically make a person an affiliate member when making a purchase unless the person expressly chooses to opt-out of the affiliate marketing program. Alternatively, system 10 is set-up so as not to automatically make a person an affiliate member upon making a purchase, but rather gives the person an opportunity to opt-in to becoming an affiliate member upon making a purchase at source 12.

As part of the process of person P1 becoming an affiliate member, system 10 associates a unique identifier with person P1. The unique identifier may be based upon information entered into system 10 by person P1 (such as an actual name or user name), or may be a randomly assigned, unique string of characters (such as numbers and/or letters, and possibly other characters) that have no visual correlation with person P1. If the system employs a technique that uses a person's name or user name as the unique identifier and there is already an affiliate member in system 10 with the same name or user name, system 10 either prompts the user to enter another user name, prompts the user to select a name from a provide list of generated names, or automatically generates a new user name (such as by adding one or more characters to the previously entered name). In particular, system 10 uses the unique identifier in a link that is placed in an electronic communication associated with the affiliate member so that access to source 12 via the provided link, and purchases then made, are associated with the affiliate member.

Figures 5A, 5B, 6:
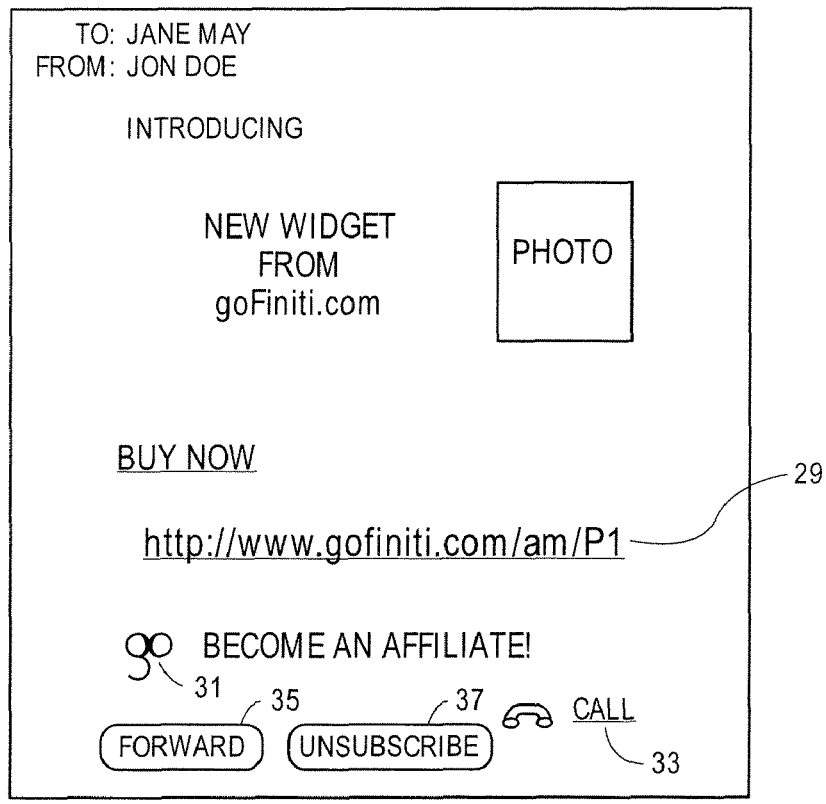
FIG. 6 depicts an example of an electronic email communication of the present invention.

FIGS. 5a and 5b illustrate examples of techniques that the present invention may employ in using an affiliate member's unique identifier to create a unique link or HTML tag. In FIG. 5a, assuming that the unique identifier for person P1 is "P1" and that the URL for the source 12 is www.gofiniti.com, the link http://www.p1.gofiniti.com is used. As shown, the unique identifier is used in a subdomain, thereby creating a unique electronic address for the affiliate member P1. Alternatively, as shown in FIG. 5b, the unique identifier may be used to create a unique path at the source site, such as http://www.gofiniti.com/am/P1, wherein "am" is an acronym for "affiliate member". It will be appreciated that this is just an example, and that other paths using an affiliate member's unique identifier may be used. It will be appreciated that the actual details of the link may, and will likely be masked or obscured by a text string or graphic in a conventional manner, at least until the link is selected or a mouse-pointer is moved over the link. As an example, a text link may be made by coding a hyperlink with a reference URL (such as a full URL or relative URL) and a text string that is to become the link, such as <A HREF="http://www.p1.gofiniti.com/">GoFiniti</A>

As an example, an image link may be encoded as:

<A HREF="http://www.p1.gofinit.com/"><IMG SRC="image.gif"></A

In one embodiment, when a person becomes an affiliate member, system 10 automatically generates an electronic communication to send back to person P1. FIG. 6 illustrates a representative example of such an electronic communication that is in the form of an email. The generated electronic communication includes the unique identifier that was assigned to person P1 during registration of person P1 as a new affiliate member. As illustrated in FIG. 6, the email includes text and/or images and/or graphics indicating information about the source 12 and/or its products, services and/or content, as well as information about becoming an affiliate member. As illustrated, a logo 31 indicative of the affiliate member opportunity is provided. Also provided is a logo, icon, symbol, mark, and/or text and a link, denoted by reference numeral 33, to initiate a voice communication with source 12 or its representative. Such a voice link, for example, could open a page that prompts the user to input his or her telephone number. The database then dials the telephone number of source 12 and establishes a connection with the user's telephone number, as well. An example of such technology is the "Click to Call" offering of Google. Additionally, in accordance with the present invention, a video conference link can be established over the connection enabling the parties to the call to engage in a video conference. Additionally, with use of Windows or different frames, or alternatively, the parties to the call can simultaneously view web-meeting or presentation slides offered by the source. The electronic communication also preferably includes a "Forward" button or link 35 and an unsubscribe (or opt-out) "button" or link 37. Additionally, and importantly, the electronic communication sent to person P1 includes at least one electronic link 29 back to the source associated with the affiliate program (source 12 or gateway 26) where the link 29 includes the unique identifier. As stated above, it should be understood that the actual details of the link may and will likely be obscured or masked by a highlighted or underlined text string or by a graphic using conventional techniques for programming links. Person P1 then forwards the received e-mail (either "as is" or by adding additional comment and/or subject matter) to others persons, such as persons P2, P3, and P4 depicted in FIG. 2. Upon receipt of the forwarded electronic communication to persons P2, P3 and P4, persons P2, P3 and P4 can access the source associated with the affiliate marketing program via the uniquely coded link provided in the electronic communication and, upon such access, system 10 is able to automatically associate the person accessing the source (i.e., P2, P3 or P4) with person P1. If person P2, P3 or P4 makes a purchase at the source 12 after making access via the provided link, person P1 may be allocated a commission for the purchase according to a commission schedule of the affiliate marketing program.

Additionally, one, some or all of persons P2, P3 and P4 may also become new affiliate members in one of the manners described above. As illustrated in FIG. 2, and solely for the purpose of an example, persons P2 and P4 become affiliate members, but persons P3 does not. In accordance with the invention, person P2 (and similar person P4) is placed on a first level (illustrated as Level 1) of the direct affiliate marketing network of person P1. A database associated with source 12 and/or gateway 26 associates P1 and P2 in that fashion so that the database recognizes P1 to be the direct sponsor of person P2. Upon person P2 becoming an affiliate member, system 10 assigns person P2 a unique identifier and sends person P2 an electronic communication, such as an email, that includes a link to source 12 or gateway 26 (i.e., a source associated with the affiliate marketing program), where that link includes the unique identifier identifying person P2.

Person P2 can then forward that e-mail to other persons, such as persons P5, P6 and P7 as shown in FIG. 2, and the process is repeated. In other words, persons P5, P6 and P7 may access source 12 via the link and make purchases and/or become a new affiliate member. In the example illustrated, persons P5 and P6 become affiliate members, but person P6 does not. As described above, system 10 generates an electronic communication for each of person P5 and P6 that includes a link containing person P5's and person P6's unique identifier, respectively, and the process continues with persons P5 and P6 forwarding the e-mail to others, as illustrated. Accordingly, new affiliate members P5 and P6 are each on a second level of person P1's multi-level affiliate network and are on a first level of person P2's network. Also, purchases made by Persons P5, P6 and P7 at source 12 may result in a commission payable to P1 and to P2 based upon a commission structure of the affiliate marketing program.

At times, a person may decide not to become an affiliate marketing member but may forward a received electronic communication to other persons. An example of this is illustrated in FIG. 2 with person P17. Person P17 did not become an affiliate member, but forwarded the electronic communication received from person P10 to person P28. Accordingly, purchases made at source 12 as a result of person P28 accessing source 12 via the link provided in the received electronic communication will be attributed to person P10 and may result in commissions to person P10 (and Persons P4 and P1) based upon the commission structure of the affiliate program. Additionally, purchases made by persons P16, P17, P18, P19, and 20 are attributed to person P10 and may entitled person P10, Person P4 and Person P1 to commission payments.

From the foregoing, it will be understood that this process replicates itself as the levels of the direct affiliate marketing organizations grow. It should also be understood that an actual multi-level organization developed with the present invention may and likely will look significantly different than the one illustrated and that there is preferably no limit to the number of persons to which an affiliate member may forward an electronic communication. So, for example, while person P1 is illustrated to have forwarded an electronic communication to three other persons, person P1 may in fact forward an electronic communication to any number of persons, and so on.

It should be understood that review and forwarding of emails by affiliate members and others, such as customers or potential customers, may be accomplished using the person's locally stored email program or the persons web-based e-mail service. Current examples of popular email programs include Microsoft Outlook and Outlook Lite. Gmail from Google and web-based email offering such as Hotmail from Microsoft, AOL's email service, and many others are well known and require no further explanation.

Figure 14:
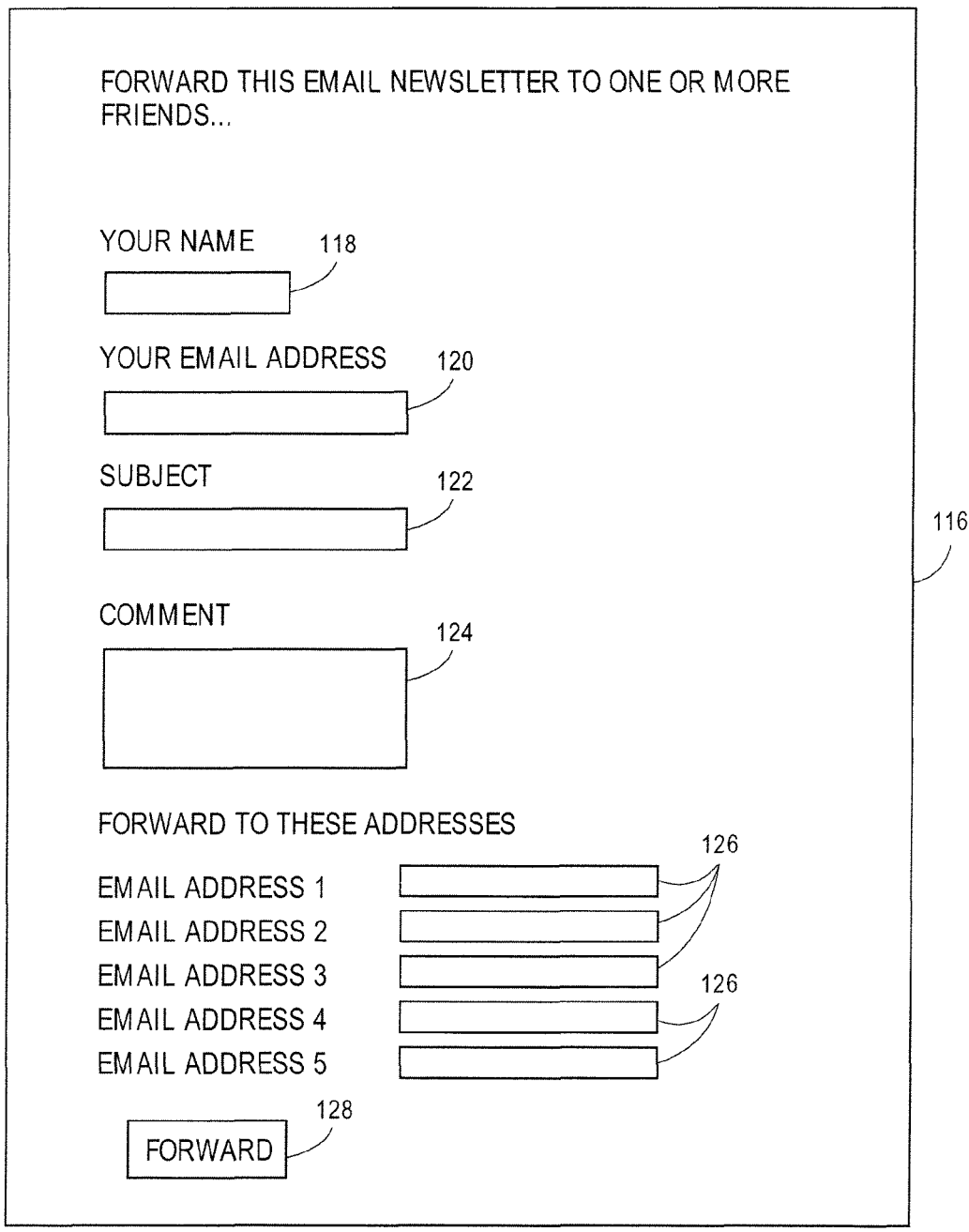
FIG. 14 depicts a web-based email tool of the present invention.

In accordance with one embodiment of the present invention, source 12 or gateway 26 provides a web-based email application, that can be used in conjunction with other email applications, as illustrated and described in FIG. 14. In particular, an email includes a "Forward" link (such as Forward link 35 in FIG. 6) which, when selected, causes a browser in a communications device 14 at which the email is being viewed to navigate to a source associated with the email, such as source 12 or gateway 26, and access a webpage and web-based email manager for forwarding the email. As shown in FIG. 14, the page provides a forwarding email template 116 including a name field 118 for inserting (using a keyboard or voice equipment and voice recognition software) the forwarding person's name, a sender's address field (of "from field") 120 for inserting the forwarding person's e-mail address, a subject line field 122 for inserting a subject line (which can be automatically populated with changeable text, such as "I think you may enjoy this"), a body or comment field 124 into which the sender may insert additional text, and one or more recipient address fields (or "To fields") 126 into which the sender inserts email address of intended recipients to whom the forwarding sender wishes to send the email. A "Forward" button or link 128 is selected (such as with a computer mouse) and the system 10 forwards the email (preferably one by one) to the named email addresses. Preferably, when multiple recipient addresses are entered, the web-based email tool sends individual emails to each recipient, rather than a bulk email. Use of this web-based email tool allows system 10 to obtain more complete information for analysis, including statistics on the number of emails that are propagated, how many are opened, how many result in access to source 12 or gateway 26, etc.

Additionally, in accordance with another aspect of the invention, the web-based forwarding tool of the present invention can be used to further add identifying information into forwarded emails. Thus, as described above, an email sent to Person P1 includes a link that uniquely identifies person P1. In one embodiment, when person P1 selects the Forward link in the email for accessing the web-based email tool of the present invention, source 12 or gateway 26 populates the link to be presented in the forwarded email with an additional identifying code. For example, the link populated by source 12 or gateway 26 may be http://www.p1.a.gofiniti.com or http://www.gofiniti.com/am/p1/a, etc. In this way, system 10 can monitor more details of the communications. For example, recipients of such an encoded link that access the site via the link are associated with Person P1 as previously described, but system 10 also records that the "a" link, for example, was accessed. If the immediate recipients of an email containing this "a" link use the web-tool to forward the email to others, system 10 can encode a new link, such as http://www.p1.b.gofiniti.com or http://www.gofiniti.com/am/p1/b. In this way, the system will be able to collect and maintain information on the level from P1 (or number of links removed from person P1) a particular person is when accessing the source 12 or gateway 26. It will be appreciated that the links can be encoded in a wide-variety of manners in addition to those illustrated by way of example here. Additional aspects of the invention include providing a limited number of "To" fields in the web-based email program, thus requiring multiple visits to the host site to send more emails than are permitted by the template. Additionally, the invention can be programmed to strictly limit the number of emails that will be sent using a particular link. Additionally, the invention can be programmed to require that the web-based forwarding tool provided by the source 12 or gateway 26 (as opposed to a forwarding feature of an email program such as, for example, Outlook) be used in order to qualify a purchase made via the link in the forwarded email for commissions. In particular, the invention can be programmed such that, once one person in the email chain fails to use the web-based forwarding tool, all subsequent purchases resulting from any links in the downstream chain of emails will fail to qualify for a commission. Alternatively, the invention can be programmed such that only purchases made in the improperly forwarded email will fail to trigger a commission, whereas recipients of such an email that forward it using the web-based tool will obtain commissions. Additionally, the system can be programmed to require an affiliate member to enter a user name and/or password before the email can be forwarded. As examples, a requirement to enter a username and/or a password can be made before accessing the webpage of FIG. 14 or before a send function with operate. Additionally, the present invention may employ anti-scripting tools to prohibit use of scripts. For example, an access code can be provided (for example before accessing page 14 or before a send function will operate) as a graphic that cannot be read by a script program. An example of such an anti-script feature is shown in FIG. 16. Such aspects of the invention, as well as data collection aspects that monitor the number of emails sent and use of additional anti-scripting tools, etc., can be used to prevent spam, as incentives to prevent spam, and/or as evidence in situations in which an allegation of spam is made. In this regard, the invention of the present system is designed to fully comply with requirements against spam electronic communications while providing a safe and effective tool for legitimate providers of product or services to market their offerings and providing an efficient income opportunity for individuals and entities that choose to become affiliates.

Figures 3, 4:
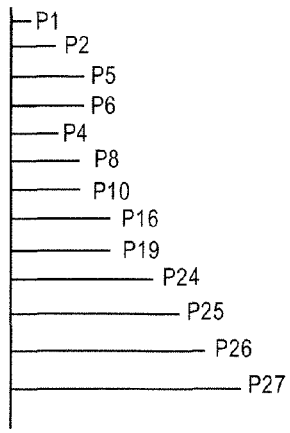
FIG. 3 depicts an example of a database table according to the present invention.
FIG. 4 depicts an example of a hierarchal database structure according to the present invention.

With additional reference to FIG. 3 and FIG. 4, examples of a database table format and a hierarchal database structure of the present invention are illustrated and described.

FIG. 3 is representative of a database table having records, represented by rows in the table, associated with each affiliate member, P1, P2, P3 . . . Pn. The database table also has columns, or database fields (or dimensions), representative of information corresponding to the affiliate members. As shown, these fields may include one or more of an affiliate member's actual name, user name (which may be different from an actual name), mailing address, email address, telephone number(s), financial or payment account information, and unique identifier (and/or link containing the unique identifier). Additionally, the database includes a sponsor field indicating each affiliate member's direct sponsor. Conventional database management and structure will be readily understood by those with skill in the art, and it will be understood that a variety of hierarchal and relational database techniques and connection attributes may be employed and that a variety of additional fields could be included in the database. One additional example of a field in the database may be a password field that identifies a password necessary for the affiliate member to access his or her user account.

FIG. 4 illustrates a graphical example of a hierarchal database structure, such as parent/child database structure, representative of the direct affiliate network illustrated in FIG. 2 and stored in the table(s) of the database. As shown, for example, Person P1 has directly sponsored person P2 and person P4. Person P2 has, in turn, directly sponsored Persons P5 and P6. As will be appreciated, each affiliate member is shown indented just beyond that affiliate member's immediate sponsor. Additionally, it will now be understood that the database (or a separate database) also maintains information on each prior customer (who is not an affiliate member) and his or her (or its in the case of an entity) affiliation with a one of the affiliate members. Accordingly, in one embodiment, in addition to including records of affiliate members, the database includes records of prior customers (who are not affiliate members), where such records include an affiliate field, similar to the sponsor field, to associate each prior customer with a one of the affiliate members.

As an additional aspect of the present invention, source 12 or gateway 26 periodically sends additional electronic communications to the affiliate members and to prior purchasers. Such a communication would be useful for offering a promotion or announcing a new product, service or content offering. Each such electronic communication sent to an affiliate member includes a link containing that affiliate member's unique code. Upon receipt of such an electronic communication, the affiliate member may access the source 12 via the provided link and make purchases and/or forward the electronic communication to others. Such additional electronic communications sent to prior purchasers who are not affiliate members will contain the unique identifier of the affiliate member previously associated with that prior customer such that a resulting purchase made via the link will be attributed to the same affiliate member.

In accordance with an aspect of the invention, an address list containing the name and/or electronic address of each person to whom an e-mail is sent containing an affiliate member's code is available to the affiliate member via a user-account (described below) of the affiliate member provided at the source 12 or gateway 26. Alternatively, such a list identifies only those persons or addresses on a first level of that affiliate member's network or who previously made a purchase as a direct result of an electronic communication directly received from that affiliate member. In this way, an affiliate member may choose not to forward the electronic communication to those who have already received such a communication from source 12 or gateway 26.

The present invention also provides a user-account for each affiliate member and the ability for an affiliate member to log into his, her or its account and develop electronic communications from templates and/or with provided and selectable text, graphics, images, and content. In this way, an affiliate member may create an electronic communication (such as an email), including a link containing the affiliate member's unique identifier, that is then sent to the affiliate member for forwarding. In this regard, system 10 preferably automatically populates the communication being created with the link containing the affiliate member's unique identifier. Alternatively, the created communication may be created online using linking and/or framing techniques and need not be transmitted to a mailbox of the affiliate member for forwarding, but may be sent directly to others from the server of source 12 or gateway 26 by populating a "To" field with electronic addresses and activating a "send" key or command. The account of the affiliate member preferably includes an electronic address book to enable such transmissions to be completed efficiently. Additionally, a serial number or other identifier may be applied to such communications and that serial number provided as a link next to each address to which it is sent so that an affiliate member may later recall those communications that have been sent to a particular addressee.

In accordance with the invention, commissions are allocated to an affiliate member, such as affiliate member P1, based upon purchases made by persons in the affiliate member's downstream multi-level organization. Such commissions are based upon a commission structure of the marketing program and could include commissions payable through a certain number of levels of an affiliate member's network (or only on one level, such as level 7, for example), and could include qualifying criteria such as the necessity that an affiliate member directly sponsor and/or retain a selected number of new affiliate members before a commission is paid. It will be understood that the affiliate membership program could provide a structure that enables promotions to progressively more senior levels, with resulting higher commissions, based upon criteria being met. However, the present invention does not require such a structure and works well with a more simple approach which does not require educating the direct multi-level organization on such a promotion-based structure. Indeed, one purpose of the present invention is to provide a unique financial opportunity to individuals (while providing a powerful distribution channel to sources of goods, services and/or content) that, after becoming an affiliate member, requires little or nothing more than sending or forwarding one or more electronic communications to others.

Commissions due to affiliate members are preferably accumulated during a select period and then paid to the affiliate members following the selected period. For example, commissions could be paid weekly, monthly, bimonthly, semimonthly, quarterly, semiannually, annually or on another defined schedule. In accordance with one preferred feature of the present invention, commission payments are made by depositing the commission payments directly into a financial account of an affiliate member. As discussed above, an anonymous payment account, such as those offered by PayPal, can be used thereby enabling an affiliate member to access the account and retrieve the payment. Also, with the availability of a financial account of an affiliate member, amounts corresponding to a commission allocation may be made at the time of a purchase, such that an amount is deposited into the affiliate member's account at the time of a purchase. Alternatively, commission checks can be cut and sent to affiliate members. Additionally, statements preferably accompany the payments or are available via an affiliate member's online user account.

As one aspect of the invention, source 12 may offer a discount buying program which enables persons to obtain discounts on purchases so long as certain criteria are met (such as paying a periodic membership fee and/or purchasing a minimum monetary amount of goods in a given time period in order to be retained in the buying program). Such a discount buying program works best with consumable products that need to be replenished periodically. If source 12 offers a discount buying program, commissions to affiliate members are also paid for such periodic purchases, even though purchases may be not as a result of a customer accessing source 12 via a uniquely encoded link since, according to one aspect of the invention, once a customer (whether part of a periodic buying program or not) is assigned to an affiliate member the customer will remain assigned to the affiliate member unless the customer has changed his or her affiliation to another affiliate member.

With additional reference to FIG. 7, representative examples of web-pages at source 12 and/or gateway 26 are illustrated and described.

FIG. 7 illustrates an example of three web pages denoted as Screen 1, Screen 2 and Screen 3. Screen 1 is representative of a web page at which a person accessing the website associated with source 12 may view upon accessing a link presented in a received electronic communications, as set forth above. Screen 1 offers a product (or service or content) for sale and provides an option to buy the product. Preferably, text describing the product and/or source 12 is also presented as is an opportunity to become an affiliate member. Screen 2 is representative of a web page at which a user enters personal information, either for the purpose of making a purchase at source 12 or for the purpose of becoming an affiliate member (or both). As will be understood, the entered information creates a record in a table of the database, described above, that is developed in accordance with the present invention. Screen 3 is representative of a webpage confirming a purchase order made by a user and displaying alternative options of (a) offering an affiliate membership (b) opting into an affiliate membership or (c) opting out of an affiliate membership. It will be understood and appreciated that web-site design, including individual page design and path development, is largely a function of the creativity of the web designer and that the illustrated Screens are provided merely as representative examples and not in a limiting sense. Persons with skill in the art will readily understand the widely available web-page data entry and shopping cart techniques and offerings. Additionally, as part of the process of registering to become an affiliate member, it will be appreciated that a variety of identifying information could be required, including entity type, position of person registering on behalf of an entity, etc., an age requirement (such as at least 18), entry of the types of electronic communications to be used in the affiliate marketing effort (emails, blogs, search, mobile, browser plug-in, website, audio or video cast, etc.) The pages shown here are for illustrative purposes only, and it will also be appreciated that a person may become an affiliate member without making a purchase.

Figure 8:
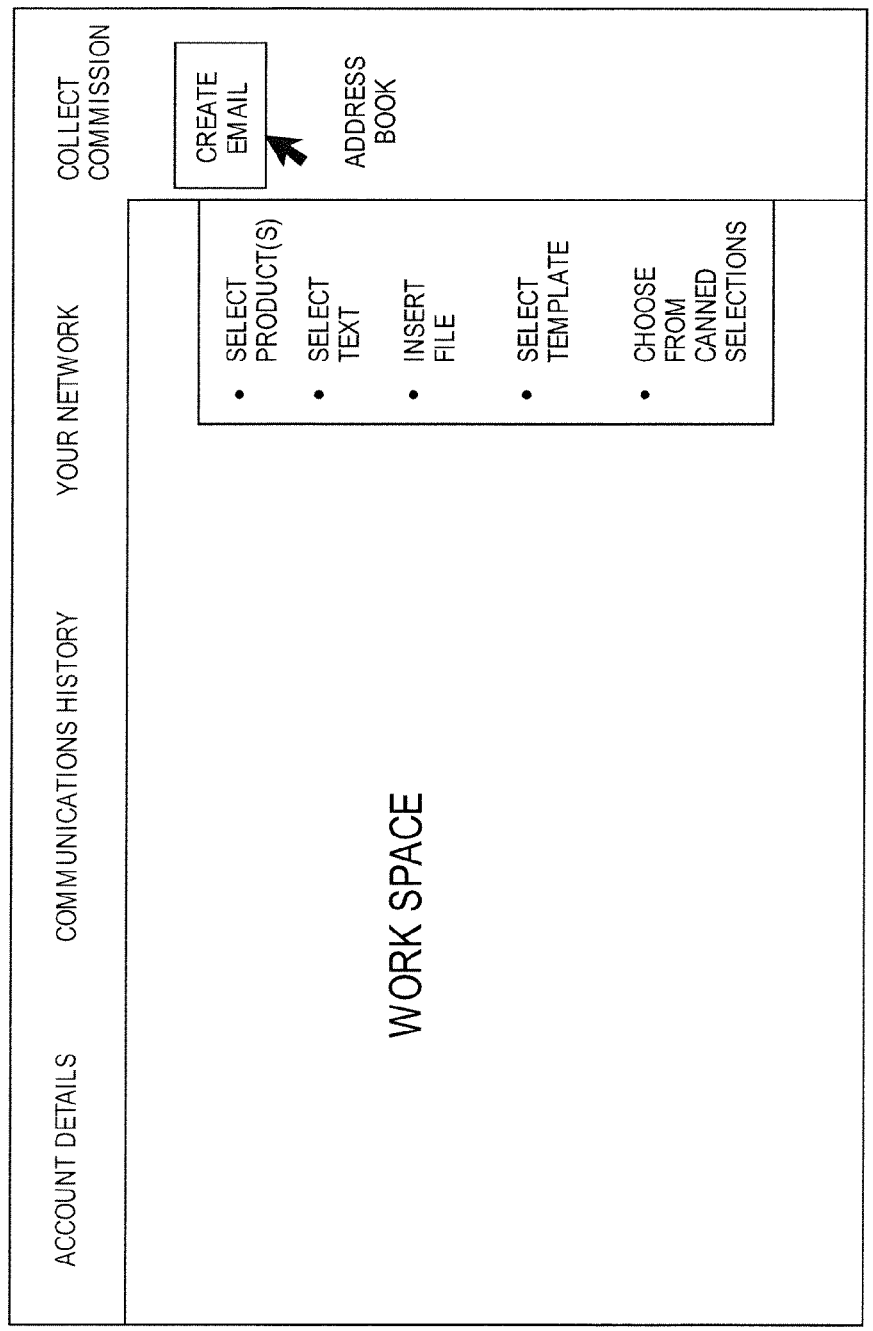
FIG. 8 depicts an example of an online user-account of the present invention.

With additional reference to FIG. 8, a representative example of a user-account of an affiliate member is illustrated and described.

As discussed, upon becoming an affiliate member, the new affiliate member may be provided with an online user account. Such a user account may be used to access a financial account for receiving commission payments, to create and manage electronic communications to be sent to others, to store historical records of prior communications and payment statements, to maintain an online address book, to maintain and update personal information, to visualize the affiliate member's direct multilevel affiliate marketing organization, and/or to review statistics concerning source 12, the affiliate member's direct multilevel affiliate marketing organization, and/or the source 12's entire marketing organization. The Screens displayed in FIG. 8 provide representative examples only and are not intended to be limiting.

Figure 9:
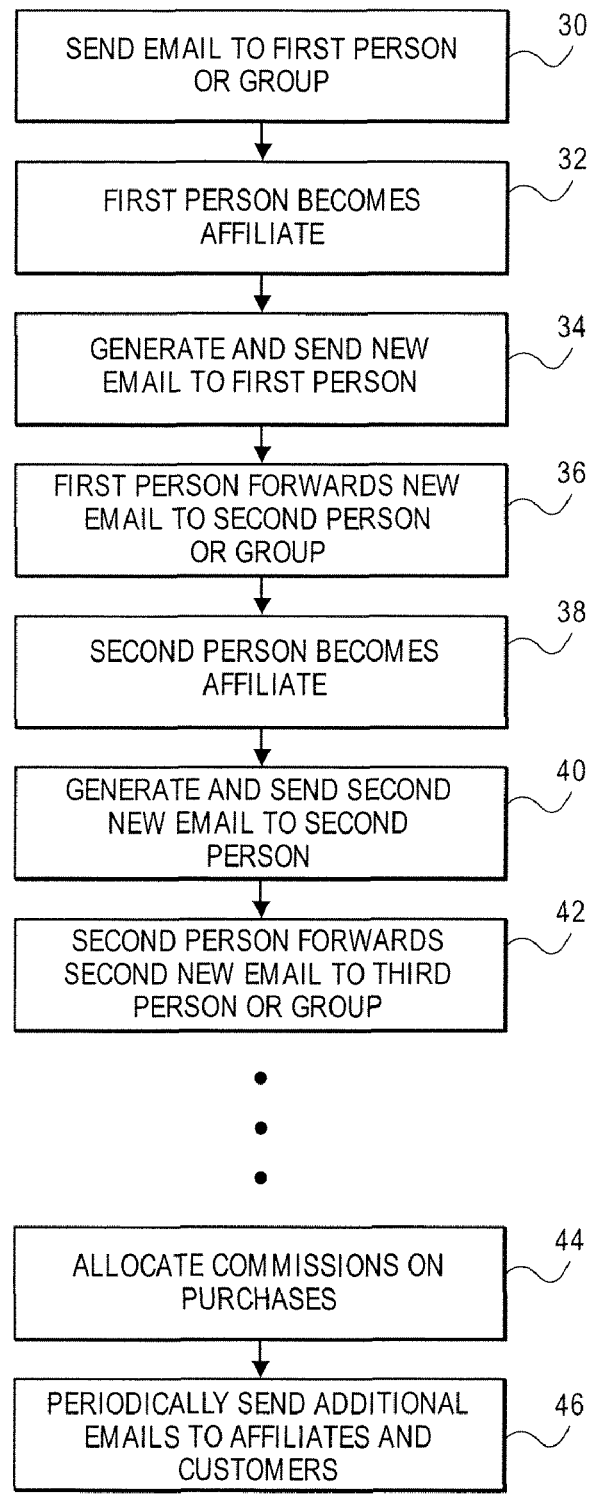
FIG. 9 depicts a flow-chart indicative of a method and operation for developing a multilevel affiliate marketing program according to the present invention.

With additional reference to FIG. 9, a flow chart of a method or methods of the present invention and the development of a direct multilevel affiliate marketing program of the present invention is illustrated and described.

As shown in FIG. 9, at step 30, system 10 sends an electronic communication, such as an email, to a first person or a first group of persons. The electronic communication preferably includes information about source 12 and/or one or more its product, service or content offerings, as well as a link to source 12 (or gateway 26) in order to link back to the source 12. At step 32, a first person (P1) accesses source 12 or gateway 26 and registers to become an affiliate member in the manner described above. As part of the registration process, system 10 assigns a unique identifier to the new affiliate member P1 and stores a new record indicative of the new affiliate member P1 in database 13 or 27. At step 34, system 10 automatically generates and sends to an electronic address of new affiliate member P1 an electronic communication, such as an email, containing a hyperlink to source 12 or gateway 26, wherein the hyperlink contains the unique identifier of affiliate member P1. At step 36, new affiliate member P1 forwards the received electronic communication containing the unique identifying link to a second person or second group of people. At step 38, a second person P2 accesses source 12 or gateway 26 via the unique identifying link in the forwarded email and becomes a new affiliate member of the affiliate marketing program by registering. As part of the registration process, system 10 assigns a unique identifier to the new affiliate member P2 and stores a new record indicative of the new affiliate member P2 in database 13 or 27. In accordance with the invention, new affiliate member P2 is related to affiliate member P1 and is considered directly sponsored by affiliate member P1 in person P1's developing direct multilevel affiliate marketing network. At step 40, system 10 automatically generates and sends to an electronic address of new affiliate member P2 an electronic communication, such as an email, containing a hyperlink to source 12 or gateway 26, wherein the hyperlink contains the unique identifier of affiliate member P2. At step 42, new affiliate member P2 forwards the received electronic communication containing the unique identifying link to a third person or third group of people, and the process of developing the direct multilevel affiliate marketing network continues. Step 44 illustrates that system 10 allocates commissions, preferably on multiple levels of the affiliate marketing network, according to a defined commission structure, on purchases made by affiliate members or others according to association of the purchaser with an affiliate member. Step 46 illustrates that system 10 periodically sends electronic communications, each encoded with a particular link identifying an affiliate member, to the affiliate member network and/or to prior customers who are not affiliate members. Such periodic communications stimulate commerce with source 12 and enhance income opportunities for affiliate members with no additional work required on the part of the affiliate members.

In accordance with an additional aspect of the invention, an advertisement with a link to another merchant may be included in such emails, where that advertising merchant may or may not be part of an affiliate program. Such advertising could (but need not be) included on a pay-per-click basis. Commissions on revenue earned by source 12 or gateway 26 for advertising may (but need not be) allocated to the affiliate members according to a multilevel affiliate commission structure.

Figure 10:
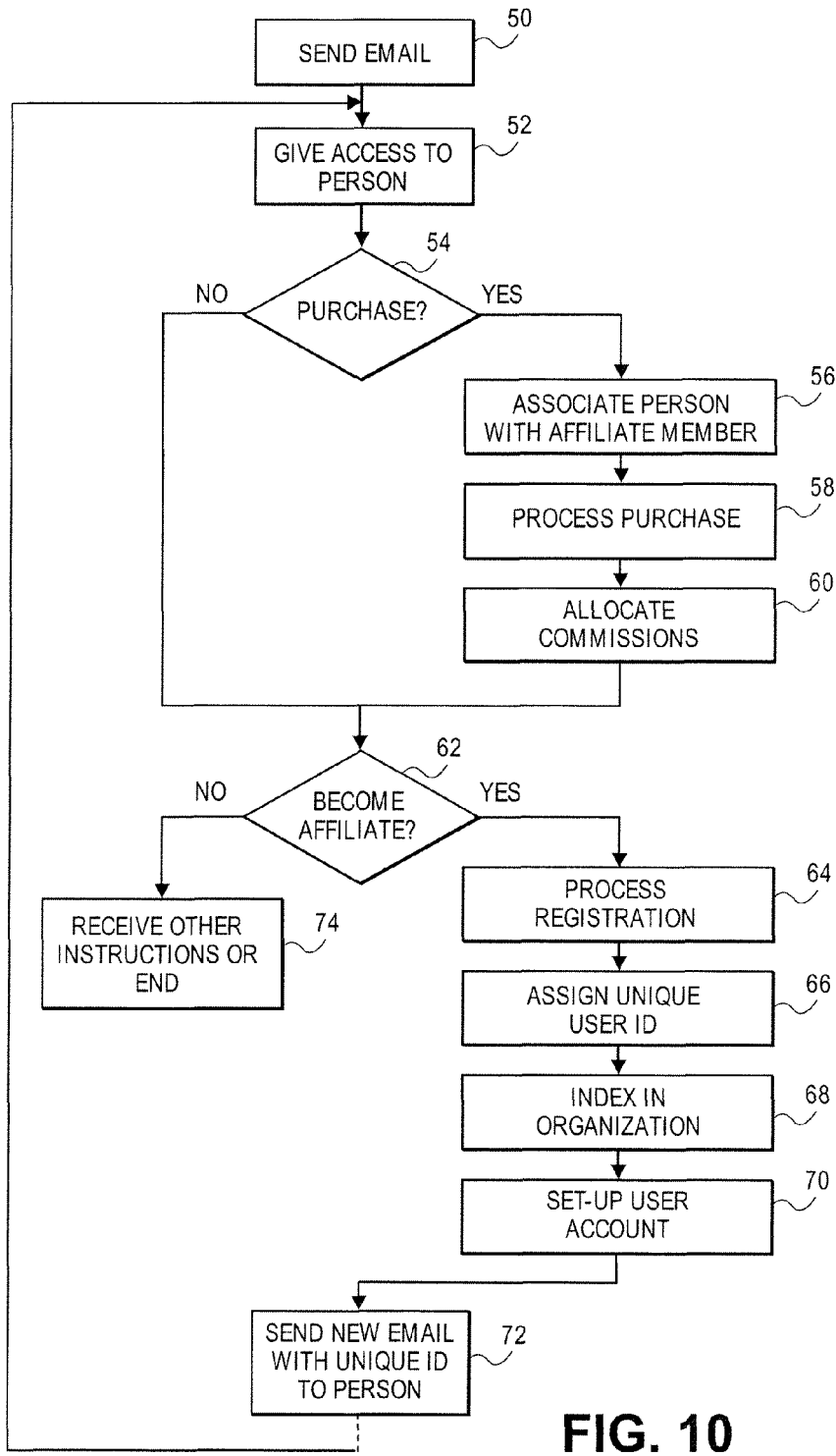
FIG. 10 depicts a flowchart of a method and operation of a system of the present invention.

With additional reference to FIG. 10, a flowchart of a method or methods carried out by, and from the perspective of, system 10 is illustrated and described.

At step 50 of FIG. 10, system 10 sends an electronic communication, such as an email, to a person or group of people. The electronic communication preferably includes information about source 12 and/or one or more its product, service or content offerings, as well as a link to source 12 (or gateway 26) in order to link back to the source 12. At step 52, source 12 grants access to a person (such as person P1) accessing source 12 via the link provided in the electronic communication. At step 54, system 10 determines whether the person P1 is making a purchase at source 12. If the person P1 is making a purchase at source 12, processing advances to step 56 at which person P1 is associated with an affiliate member, if any. As will be apparent from the description above, this association is typically made by capturing the identity of the affiliate member from the hyperlink used to access the site and retrieving the corresponding affiliate member's identity from the database. As will be appreciated, in the example provided herein, person P1 sits at the top of a branch of the affiliate marketing network, and therefore has no direct affiliate member sponsor. Once person P1 is associated with an affiliate member, if any, processing advances to step 58 at which the desired purchase(s) is/are processed. At step 60, system 10 allocates a commission (if any) to those affiliate members who earn a commission on the purchase(s) based upon the association with an affiliate member (and the resulting indirect association with an affiliate network) and a defined commission structure. At the completion of step 60, or if it is determined at step 54 that no purchase is being made, processing then advances to step 62.

At step 62, system 10 determines whether person P1 is to become an affiliate member of a multilevel affiliate marketing program associated with source 12. As described above, the set-up of system 10, or the particular affiliate marketing program being conducted, will influence how processing occurs. For example, as described above, the multilevel affiliate marketing program may default all purchasers to become an affiliate member unless he or she opts out of that opportunity. Alternatively, system 10 may require that the person, such as person P1 in the example, choose to become an affiliate member. Also, a person (such as Person P1) may choose to become an affiliate member even though person P1 has not made a purchase. In any case, when system 10 determines at step 62 that person P1 is to become an affiliate member, processing advances to step 64 at which system 10 processes the registration of person P1 as a new affiliate member by prompting person P1 to enter identifying information, as described above. As part of the registration process, system 10 assigns person P1 a unique identifier (step 66), indexes the new affiliate member P1 in the proper location of the developing affiliate marketing network by placing a record for new affiliate member P1 in the database 13 or 27 (step 68), and may establish an online accessible user account for the new affiliate member P1 (step 70). Additionally, as part of the registration process, the user either establishes a payment account or uses a payment account already established. Payment accounts such as those offered by PayPal and Google are examples of the type of payment account established or used in accordance with the present invention. In particular, such accounts use a second payment account (such as a credit, debit or check account) and include steps of verifying a bank account. Such verification steps may include, for example, making two small deposits into the bank account of the user and then requiring the user to confirm online the date and amounts of those deposits. Accordingly, in the event that person registering as an affiliate member does not already have a payment account, the registration process may be delayed while these verification procedures are carried out. As described above, the unique identifier may be used in a hyperlink presented in electronic communications for granting access to source 12 (or gateway 26) and to allow system 10 to associate an access to the source 12 (or gateway 26) with the new affiliate member P1. Although not illustrated, the registration process may also require the new affiliate member P1 to make a payment (if a payment is required to become an affiliate member) and to agree to the terms of one or more agreements.

Upon completion of the registration process, processing advances to step 72 at which system 10 automatically generates and sends at least one electronic communication to an electronic address of new affiliate member P1. In one embodiment, as described above, the electronic communication sent at step 72 includes the unique link identifier of affiliate member P1 so that persons accessing source 12 (or gateway 26) via the link can be associated by system 10 with person P1. As described above, the electronic communication sent to person P1 at this step comprises a previously made email template, containing information such as that set forth in FIG. 6, albeit with the unique link placed into the communication, where the email is retrieved from a memory of the system, populated in its body with the unique link, populated in an address field with an email address of person P1, and sent to the email address of P1. In accordance with a more advanced aspect of the present invention, system 10 stores a number of different premade (i.e., canned) email templates, and system 10 automatically selects which template to use based upon information pertaining to person P1. For example, during the registration process, person P1 could be asked to provide personal information (perhaps allowing the response to be optional) pertaining to his or her age, income level, school graduation level, and/or gender. Additionally, system 10 could prompt person P1 to enter personal preference information of a variety of types. Based upon that information, system 10 could choose an email template that is designed in a way that is believed to be the most successful with, or useful to, person P1. Alternatively, if person P1 made a purchase, then system 10 could use that information to select a particular canned email or to populate the email. For example, if person P1 bought a product known as "widget A", the email could be populated with information about widget A and with text such as "I bought widget A. I think you would like it, too." Additionally, products that relate to widget A, fall in the same category as widget A, or which system 10 knows that others who have bought widget A have also bought could be represented in the email communication. These features of the present invention further personalizes the process of developing the affiliate marketing network and makes the electronic communications more relevant to its target (i.e., person P1 in this example) and those to whom person P1 is likely to send the email. Accordingly, as one example, an organization that offers books pertaining to a particular subject could have information about those persons that are potentially and most likely interested a book on that particular subject. Of course, this level of complexity is not necessary to meaningful use of the present invention. As will be appreciated from the foregoing, person P1 can then forward the received electronic communication to others and processing returns to step 52 concerning those attempting to access source 12 or gateway 26 via the uniquely coded link.

If it is determined at step 62 that person P1 is not to become a new affiliate member, then system 10 awaits instruction from person P1, if any, such as redirect to other pages to review more product, etc., or ends processing, as illustrated at step 74. However, as far as processing concerning the development of the multilevel affiliate marketing network is concerned, processing is ended at step 74. However, as will be appreciated, the person P1 may, in such a case, elect to become an affiliate member before leaving the site, in which case system 10 would make that determination at step 62 and processing returns to the registration process.

The following table, denoted as Table 1, is an example of a commission structure that source 12 has decided upon for its affiliate marketing program.

TABLE 1

| Level 1 | 1% |
|---------|-----|
| Level 2 | 1% |
| Level 3 | 1% |
| Level 4 | 1% |
| Level 5 | 1% |
| Level 6 | 1% |
| Level 7 | 4% |
| Total   | 10% |

In particular, as illustrated in this example, source 12 has elected to pay commissions of up to ten percent (10%) to the multilevel affiliate marketing organization on purchases made at source 12 according to the present invention. Additionally, source 12 has structured its commission program to pay commissions to an affiliate member for purchases made through seven levels of that affiliate member's direct multilevel affiliate market network. As illustrated in Table 1, commissions for on purchases made on a first level (including directly sponsored affiliate members and their customers) is one percent (1%). Similarly, source 12 has elected to pay a one percent (1%) commission on purchases made by affiliate members and their customers on levels two (2) through six (6). Source 12 has elected to make a larger commission allocation and payout of four percent (4%) on purchases made by affiliate members and their customers on level seven (7). It should be understood that the commission structure shown in FIG. 11 is merely one example and that the software of the present invention is scalable and allows a merchant to structure the commission program in a wide-variety of manners. For example, a merchant can choose the total commission percentage to be allocated and paid to the multi-level affiliate marketing organization. The merchant can choose the number of levels through which to spread a commission for a purchase. The merchant can choose the particular percentage commission to pay on each level. Additionally, the software and system of the present invention permits the establishment of prerequisites or criteria for making a commission payment, such as the necessity to have directly sponsored a minimum number of persons or the requirement of a minimum monetary amount of purchases in a given period before a commission is triggered. Additionally, the affiliate marketing program can include promotions and/or bonus structures, with commission payouts and/or bonuses being based upon a particular position, promotional level or other accomplishment of an affiliate member. It should be understood, however, that such additional complexity is not a requirement of the present invention and that one preferred embodiment of the present invention is a simple multi-level direct affiliate marketing program with a consistent commission structure and no opportunities for promotion.

Accordingly, using the commission structure illustrated in Table 1 and the example of person P1's direct affiliate marketing network shown in the graphical tree of FIG. 2 and the database structure of FIG. 4, an example is now provided. In particular, assume that affiliate member P27 or a customer of affiliate member 27 (meaning a purchaser who has not become an affiliate member) makes a $100 (USD) purchase at source 12 according to the principles of the present invention. System 10, and particularly a processor (i.e., server) at system 10, captures the unique identifying link and associates that link with person P27 using the database described above. Using the commission structure found in Table 1, which is provided in memory, the system calculates that a ten percent (10%) commission is payable to the multi-level affiliate marketing network. Using the database, system 10 determines that person P27 is on the first level of person P26, who in turn is on the first level of P25, who is on the first level of P24, who is on the first level of P19, who is on the first level of P10, who is on the first level of P4, who is on P1's first level. Accordingly, using the commission structure of the affiliate marketing program as set forth in Table 1, system 10 allocates a commission on the $100 (USD) purchase as set forth in the following Table 2.

TABLE 2

| Person P1 | 4% | $ 4.00 | (7$^{th}$ level commission) |
|---|---|---|---|
| Person P4 | 1% | 1.00 | (6$^{th}$ level commission) |
| Person P10 | 1% | 1.00 | (5$^{th}$ level commission) |
| Person P19 | 1% | 1.00 | (4$^{th}$ level commission) |
| Person P24 | 1% | 1.00 | (3$^{rd}$ level commission) |
| Person P25 | 1% | 1.00 | (2$^{nd}$ level commission) |
| Person P26 | 1% | 1.00 | (1$^{st}$ level commission) |
| Total | 10% | $10.00 | |

It will also be understood that the affiliate marketing program can be, and will often likely be, structured to pay a direct commission back to an affiliate member for his and/or her own purchases and the purchases of customers directly associated with the affiliate member. Such commissions may be identified as being on Level 0, for example. In other words, while the foregoing example shows multilevel commission payments on levels beneath an affiliate member, it will be readily understood that the commission structure could include commissions on level 0, or that level 0 commissions are part of a separate commission structure. For example, the commission structure could be set-up to require prerequisites for commission payouts on levels 1-7 (as discussed) without requiring the same prerequisites for a commission payout on level 0. Additionally, multiple commission structures may be used. Assume, for example, that an organization sells voice-over-IP subscription services as well as communications hardware, such as handsets, desktop voice-over-IP telephones and computers. One commission structure may be applicable to commissions on sales of the VOIP service and another commission structure may be applicable to commissions on sales of communications hardware. Similar examples of the potential use of multiple commission structures could apply to organizations that sell content (media such as music and videos and/or digital books) and media players. Accordingly, the provided example is merely one example of an approach that could be utilized, but should in no way be construed as limiting.

With reference to FIG. 11, an electronic toolbar of the present invention is illustrated and described.

FIG. 11 illustrates an electronic toolbar denoted by reference numeral 100 that may be downloaded from source 12 or gateway 26 for placement, for example, on a desktop screen of a communications device 14. As illustrated, toolbar 100 may include a variety of objects 104 and may be used for a variety of functions and purposes. Toolbar 100 is shown having a logo 102 associated with source 12 or gateway 26 and objects indicative of functions associated with the direct affiliate marketing program of the present invention. The objects of the toolbar are hyperlinks that, when selected, link communications device 14 to a corresponding page of a website associated with source 12 and/or gateway 26. As illustrated, many of the objects in the toolbar correspond to objects and features of the user-account described above in conjunction with FIG. 8. Additionally, the toolbar can be used to be notified of alerts awaiting at source 12 or gateway 26.

With reference to FIG. 12, an alternate embodiment of the present invention is illustrated and described.

Figure 13:
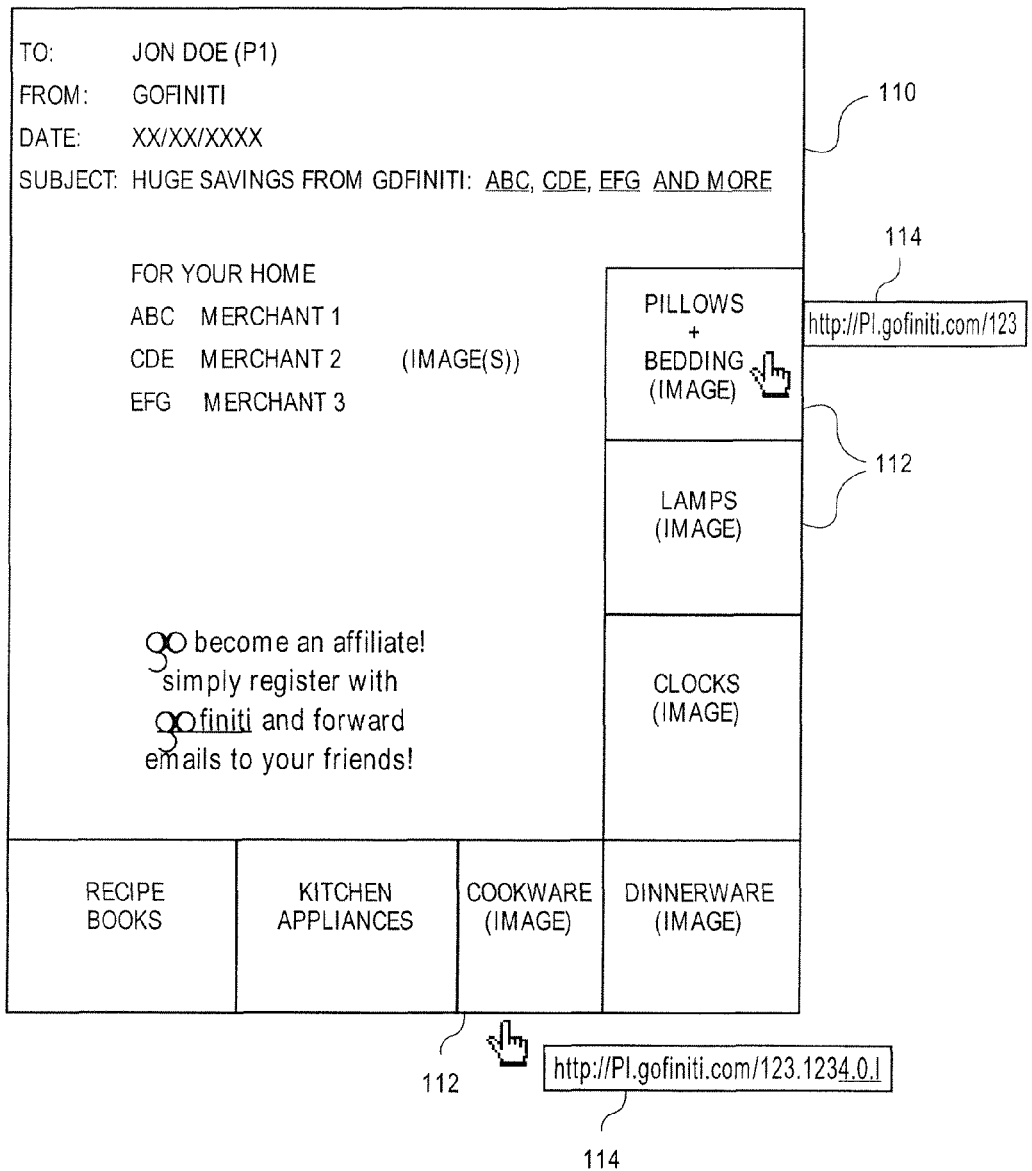
FIG. 13 depicts an example of an electronic email communication of the embodiment of the present illustrated and described in conjunction with FIG. 12.

FIG. 12 is similar to FIG. 1. However, in the embodiment of FIG. 12 the gateway 26 serves as a portal 106 that provides and manages the multilevel affiliate marketing program of the present invention. In particular, the portal 106 has relationships, such as contractual affiliate relationships, with a number of different merchants 108. Portal 106 prepares electronic communications presenting goods, services or content of merchants 108 and develops a multi-level affiliate marketing network as described above. In such an embodiment, portal 108 operates to perform the affiliate member registration process described above and operates to capture the identity of an affiliate member upon access to the portal using a uniquely coded link in an email, and then redirects the accessing party to a particular merchant 108 that is also identified by the link. In one embodiment of the invention, portal 108 creates and sends emails that contain information regarding a plurality of different merchants, such as for example the email illustrated in, and described below in conjunction with, FIG. 13. As illustrated in FIG. 13 by way of an example, particular content or subject matter presented in an electronic communication from portal 108 corresponds to one merchant 108, such as Merchant 1, while other content or subject matter presented in the email from portal 108 corresponds to a different merchant 108, such as Merchant 2. Accordingly, each particular content or subject matter has a different link associated with it. Accordingly, when a person receiving the email selects a particular content or subject matter, he or she is navigated to portal 106. Portal 106 captures the identity of the affiliate member as described above (in this example, person P1) and also uses the specific information in the link to redirect the person to a corresponding page on a website of the merchant associated with the selected content or subject matter. Thus, for example, assume that the content "cookware" in the email of FIG. 13 corresponds with a company "Merchant 1" represented in the email, which in turn is Merchant 1 in FIG. 12. When, for example, person P1 forwards the email of FIG. 13 to person P2 and person P2 selects "cookware", person P2 (i.e., his or her communications device 14) is navigated to source 106 and source 106 associates the access with person P1 (as described above) and redirects the navigation to a corresponding page on the website of Merchant 1. Any purchases made by person P1 are reported back to portal 106 and portal 106 allocates any earned commissions to person P1. Accordingly, as a simple example, assume person P2 purchases $100 (USD) of cookware at Merchant P1 and Merchant P1 has agreed to pay portal 106 a 15% commission. Merchant P1 would pay portal 106 $15.00 for the commission. In turn, portal 106 would allocate commissions to the various levels of the multi-level affiliate marketing organization according to a defined commission structure. For example, in the present embodiment, perhaps portal 106 has structured its commission payouts to amount to 50 percent (50%) of its receipts, in which case 7.50 would be returned to the affiliate member network according to the commission structure in place.

In accordance with an additional aspect of the present invention, portal 106 may conduct limited marketing programs for merchants. Examples of such limited programs include new product introductions and/or periodic promotions in which commissions are only paid during a period of time or for a particular product (or both). Such programs can be used by merchants to increase traffic and sales to a site without obligating the merchant to ongoing affiliate commissions to source portal 106.

With additional reference to FIG. 13, email 110 contains a plurality of different subject matter or content areas 112, each corresponding to a different merchant. Each subject matter or content area preferably includes text and/or images to present the subject matter or content and references a unique link 114. Thus, the electronic address and/or path for each subject matter or content area is unique, thereby enabling portal 106 to identify the proper affiliate member and a source to which to redirect navigation. Alternatively, it should be understood that each unique link 114 may navigate directly to the associated Merchant 108 and that the Merchant 108 then communicates back with portal 106 any purchase and/or commission information. Additionally, email 110 preferably includes trademarks, names or logos of the Merchants 108. For example, the each item in the list of Merchants 108 set forth in the email 110 may also be a link to link to a website of that particular merchant.

With additional reference to FIG. 15, an additional embodiment and/or feature of the present invention is illustrated and described.

In one embodiment of the invention in which multiple merchants are involved, the present invention may offer the ability of an affiliate member to select the merchants with which he, she or it wishes to be affiliated. For example, in the embodiment discussed above with reference to FIG. 12 and FIG. 13, one embodiment of the invention is that an affiliate member is automatically associated by default with all participating merchants but, using the personal user-account, the affiliate member can unselect desired merchants. Thus, for example, if an affiliate member is philosophically opposed to an affiliation with a particular merchant, the affiliate member may participate in the affiliate marketing program but need not be affiliated with that particular merchant. Alternatively, a new affiliate member can be prompted to visit a web-page at which merchants are selected by name or by product/service content category, such as shown in FIG. 15. Additionally, the system can require a payment for each affiliate member chosen to be represented and can place limits on representation such that a person can only represent a selected number of merchants at a time or within a given time-frame.

In accordance with another aspect of the present invention, each affiliate member may access websites of participating merchants via the affiliate member's user account and get discounts on purchases made at participating merchants by virtue of the a contractual agreement with source 12, gateway 26, or portal 106 and the participating merchants. By accessing a participating merchants website via a user-account, the affiliate member is identified such that discounts and/or commissions can be applied. Additionally, each affiliate member may be given a coupon number or code for providing to participating merchants in order to obtain a discount and/or get commission-credit for purchases (whether online on the Internet or not). Additionally, each affiliate member may be issued a shopping account that may be used at participating merchants to obtain a discount and/or get commission credit for purchases. Such a shopping account may include a shopping card that is swiped, scanned or otherwise read or detected at a point of sale terminal. Additionally, the account may be combined or associated with debit or credit account features such that the account is also used for paying for purchases.

From the foregoing, it is seen that the present invention offers a unique and highly effective and efficient way to develop and maintain a multilevel affiliate marketing network or organization of independent affiliate members. Through simple e-mail campaigns, a network can develop virally with little effort on the part of affiliate members. It should be understood that the present invention may be comprised of a suite of software tools or modules, such as a shopping cart module for performing shopping cart and payment functions (or communicating with other modules for payment functionality) and a separate affiliate member management module for managing some or all of the functions of registration of affiliate members, assigning unique identifiers, generating electronic communications with uniquely encoded links, providing user-accounts, and allocating commissions. Additionally, it should be understood that the present invention may cooperate with existing multi-level marketing management software and tools so that existing multi-level marketing programs, such as those having independent consultants, may adopt the unique multi-level affiliate marketing inventions set forth herein. It should also be understood that aspects of the present invention may operate at gateway 26 in a behind-the-scenes manner, such that access to source 12 results in communications between source 12 and gateway 26 such that gateway 26 is not an initial access site, but is rather a processing site to which some or all of the processing and/or storage functions of the present invention are transferred.

Additionally, while the preferred embodiment of the present invention involves visual communications such as emails, it should be understood that the techniques of the present invention may be employed with audio embodiments, such as a VOIP communications device that receives a recorded audio message that contains a unique identifier of an affiliate member. A telephone number may be digitally provided for allowing the VOIP communications device to then connect to a source and enter the unique identifier or, as technology permits, to automatically transmit the unique identifier received from the message. Accordingly, use of the "electronic communication" as set forth herein is intended to include, but not be limited to, visual communications, audio communications, and combinations thereof. It should also be understood, from the description above, that the electronic communications may be wireless, such as wireless emails and messages sent to a cellular telephone. Additionally, the uniquely encoded links generated by the system of the present invention may be placed in, or communicated in conjunction with, electronic communications such as, RSS feeds, electronic chats, instant messages, search results (including a paid sponsorship), advertisements, threads or messages in online forums, web-pages, including but not limited to shared web-pages, mash-ups (that mix and match content), wikis (such as a free web-page that is easily edited by a member of the public, with the link presumably being placed by the one who establishes or maintains the wiki), and filters (that filter content based upon criteria).

It will be understood that certain features and subcombinations of the present invention are of utility and may be employed without other features or subcombinations of the present invention. This is contemplated by and is within the scope of the claims. Since many possible embodiments may be made of the invention without departing from the scope thereof, it will be understood that all subject matter herein and in the accompanying drawings is to be interpreted as illustrative, and not limiting.

What is claimed is:

1. A computer-implemented communications and marketing method comprising:

providing, via an electronically-accessible site, a communication platform, wherein said providing of said communication platform employs at least one electronic processor and a database;

associating with at least one provider of digital media;

providing an electronically-accessible affiliate marketing program into which persons may register as affiliate members, wherein said providing of said affiliate marketing program employs at least one electronic processor and a database;

receiving a registration of a person registering to be an affiliate member in said affiliate marketing program;

providing, in conjunction with said communication platform, said affiliate member access to items of information regarding said digital media, wherein each item of information corresponds to a corresponding digital media item that can be purchased;

providing, to said affiliate member via said site, an electronically-accessible visual display area;

enabling said affiliate member to enter text for display via said visual display area corresponding to the affiliate member;

enabling the affiliate member corresponding to said visual display area to select, from said items of information pertaining to said digital media, information for presentation in the visual display area;

associating, with said information selected for presentation in the visual display area of the affiliate member, an electronic link for linking with a source of the digital media to which the selected information pertains and enabling an electronic processor to identify the affiliate member associated with the visual display area;

displaying additional information that is indicative of an opportunity to become an affiliate member of said electronically-accessible affiliate marketing program, wherein said information that is indicative of an opportunity to become an affiliate member of said affiliate marketing program comprises at least one of an icon, a logo, and text indicative of an opportunity to become an affiliate member in said affiliate marketing program;

communicating said visual display area of said affiliate member by publishing to said site said visual display area including said information selected for presentation in the visual display area;

providing each said affiliate member a user account accessible via said site and requiring log-in credentials for access to said user account;

providing, as part of said communication platform, electronic messaging functionality that enables creating and sending an electronic message;

generating, and providing via said user account of the affiliate member, a contact list for enabling electronic communication with other persons who are in a direct electronically-networked relationship with the affiliate member;

storing in a database information indicative of said direct electronically-networked relationship;

providing, as part of said electronic messaging functionality, the ability to send the created electronic message to a recipient, who is identified in the user's contact list, via the electronic communication platform;

receiving, at an electronic processor and initiated from a communications device, an electronic indication that a one of said electronic links corresponding to a digital media item and presented in said visual display area of the affiliate member at said site at which said visual display area is presented has been selected, wherein said received electronic indication comprises an electronic communication indicative of a selection of said electronic link;

electronically directing, based upon said received electronic indication that a one of said electronic links is in said visual display area at the site at which the visual display area is presented has been selected, the communications device from which said selected electronic link was selected to said source corresponding to the digital media item associated with said selected electronic link;

allocating a first commission to said affiliate member based upon an electronic linking by a person to said source of digital media via said electronic link in said visual display area corresponding to the affiliate member;

paying the first commission to the affiliate member;

making a new affiliate member each person that responds to said displayed opportunity to become an affiliate member and registers to become an affiliate member;

sending a specialized electronic communication to each of said new affiliate members, wherein each said specialized electronic communication contains a link to said source of digital media and is tagged with an identifier that uniquely corresponds with the new affiliate member receiving the specialized electronic communication;

providing access to said source of digital media to people who electronically select a one of said uniquely tagged links corresponding to a one of said new affiliate members;

making an additional new affiliate member of each said additional person who, after linking via an electronic link corresponding to a one of said new affiliate members, registers to become an affiliate member;

sending an electronic communication to each said additional new affiliate member, wherein said electronic communication contains a link to said source of digital media and further includes a unique identifier for identifying the additional new affiliate member receiving the electronic communication;

providing access to said source of digital media to additional people who electronically link via a link corresponding to a one of said additional new affiliate members;

allocating a second commission to a new affiliate member for a purchase of digital media that is made by a person to whom access to the digital media was provided via said electronic link corresponding to said new affiliate member, wherein said second commission is allocated based upon the association of the person making a purchase with said new affiliate member; and paying the second commission to the new affiliate member to whom the second commission was allocated.

2. The method as set forth in claim 1 wherein said specialized electronic communication to each new affiliate member includes information regarding the opportunity to become an affiliate member so that those to whom the electronic communication is forwarded or published are made aware of the opportunity.

3. The method as set forth in claim 1 wherein said associating with at least one provider of digital media comprises associating with a source of music and video.

4. The method as set forth in claim 1 wherein said associating with at least one provider of digital media comprises associating with a source of -digital books.

5. The method as set forth in claim 4 further comprising providing a digital device for outputting said digital books, wherein said method further comprises paying the first commission to said affiliate member based upon a purchase of a digital book by a person who linked to said source via said electronic link corresponding to said purchased digital book presented in said visual display area of said affiliate member to whom said first commission is paid, and paying a third commission to said additional new affiliate member based upon a purchase of a digital device by a person who linked to said source via said electronic link corresponding to said purchased digital device presented in said visual display area of said additional new affiliate member, wherein said first commission is according to a first commission structure for digital books and said third commission is according to a second commission structure for devices.

6. The method as set forth in claim 1 wherein said communicating said visual display area of said affiliate member by publishing to said site said visual display area including said images selected for presentation in the visual display area comprises publishing said visual display area to a site of said provider of said communication platform.

7. The method as set forth in claim 1 wherein said displaying additional information that is indicative of an opportunity to become an affiliate member comprises having an associated electronic link for linking to said provider for registering as an affiliate member of said electronically-accessible affiliate marketing program.

8. The method as set forth in claim 1 further comprising allocating a particular commission to a particular affiliate member based upon a purchase made by an individual associated with any affiliate member linked to the particular affiliate member through a selected level from said particular affiliate member.

9. The method as set forth in claim 1 wherein said allocating a first commission to said affiliate member based upon an electronic linking by a person to said source via said electronic link in said visual display area corresponding to the affiliate member comprises allocating said first commission to said affiliate member based upon a purchase of a digital media item by said person at said source.

10. The method as set forth in claim 9 said method further comprising providing, as part of said electronic messaging functionality, a forwarding function.

11. The method as set forth in claim 10 further comprising tracking a commission that is due and that results from access to said digital media source via an electronic link from a recipient of information that includes said electronic link that was forwarded with said forwarding function of said electronic messaging functionality.

12. The method as set forth in claim 1 further comprising:
enabling said affiliate member to sponsor other persons as affiliate members; and
storing sponsorship information of affiliate members so that a multi-level affiliate organization for each affiliate member is maintained.

13. The method as set forth in claim 12 further comprising:
allocating commissions to each affiliate member that is electronically related to said affiliate member to whom said first commission was allocated through a selected level from said affiliate member, wherein said selected level is greater than one level removed from said affiliate member.

14. The method as set forth in claim 1 wherein said providing access to items of information regarding said digital media comprises providing access to digital images corresponding to said digital media and wherein said enabling the affiliate member corresponding to the visual display area to select information for presentation in the visual display area comprises enabling the affiliate member to select a digital image corresponding to a digital media item.

15. The method as set forth in claim 1 further comprising providing, via said affiliate member's user account, access to commission reports, historical records of prior electronic communications made via said user account, the ability to update personal information, and the ability to review information concerning an electronic network of relationships corresponding to the affiliate member.

16. The method as set forth in claim 1 further comprising, when the affiliate member purchases a digital media item from the source of digital media, automatically generating and sending to the affiliate member an electronic communication, for forwarding to others and for marketing the purchased digital media item to others, that indicates that the affiliate member purchased said purchased digital media item and including a new electronic link to said source at which said purchased digital media item is offered.

17. The method as set forth in claim 16 further comprising said electronic messaging functionality of said communication platform electronically forwarding to others said automatically generated and sent electronic communication indicative of said digital item purchased by said affiliate member.

18. The method as set forth in claim 1 further comprising:
providing digital books for purchase;
providing an online shopping cart;
enabling purchase of a digital book via said online shopping cart.

19. The method as set forth in claim 1 wherein said generating, and providing via said user account of the affiliate member, a contact list for enabling electronic communication with other persons who are in a direct electronically networked relationship with the affiliate member comprises generating a contact list containing information only for those persons in a direct electronically networked relationship with the affiliate member.

20. The method as set forth in claim 1 wherein the electronically-accessible site is a website that is accessible online.

21. The method as set forth in claim 1 wherein said receiving, at an electronic processor and initiated from a communications device, an electronic indication that a one of said electronic links corresponding to a digital media item and presented in said visual display area of the affiliate member at said site at which said visual display area is presented has been selected comprises receiving said indication from a mobile wireless communication device.

22. The method as set forth in claim 1, wherein said electronically accessible site is a website accessible online, said method further comprising:
enabling each of a plurality of merchants to participate in a discount program; and enabling said affiliate member to obtain a coupon for providing to a said merchant that is participating in said discount program.

23. The method as set forth in claim 22, wherein said enabling the affiliate member to obtain a coupon for providing to a said merchant that is participating in said discount program comprises enabling the affiliate member to obtain a coupon for providing to said merchant in order to obtain a discount for an online purchase made at said merchant via the Internet.

24. The method as set forth in claim 22, wherein said enabling the affiliate member to obtain a coupon for providing to a said merchant that is participating in said discount program comprises enabling the affiliate member to obtain a coupon for providing to said merchant in order to obtain a discount for a purchase made at said merchant that is not an online purchase made via the Internet.

25. The method as set forth in claim 1, wherein said electronically accessible site is a website accessible online, said method further comprising:
enabling each of a plurality of merchants to participate in a discount program; and
enabling a said affiliate member to obtain a discount on a purchase made at an online site when said affiliate member accesses said online site of said participating merchant via said user account of said affiliate member.

26. The method as set forth in claim 1 further comprising providing a payment account to the affiliate member of said online communications platform, wherein said payment account enables the affiliate member to make payments with said payments account.

27. The method as set forth in claim 26 wherein said paying said first commission is performed by depositing said first commission payment into said provided payment account.

28. The method as set forth in claim 27 further comprising associating a bank account of the affiliate member with said provided payment account of the affiliate member.

29. The method as set forth in claim 28 wherein said providing said payment account further comprises providing a payment account that has a debit feature.

30. The method as set forth in claim 28 wherein said providing said payment account further comprises providing a payment account that has a credit feature.

31. The method as set forth in claim 28 further comprising enabling the affiliate member to make payments with a payments device at point of sale terminals.

32. The method as set forth in claim 31 wherein said enabling the affiliate member to make payments with a payments device at point of sale terminals comprises providing the affiliate member a payments card.

33. The method as set forth in claim 32 further comprising:
enabling each of a plurality of merchants to participate in a discount program; and
enabling the affiliate member to obtain a coupon for providing to a said merchant that is participating in said discount program.

34. The method as set forth in claim 28 further comprising enrolling said affiliate into said payment account as part of a process of registering the affiliate member as an affiliate member.

35. The method as set forth in claim 1 further comprising, when the affiliate member purchases a particular digital media item from said source, generating a new electronic communication intended for viewing by other persons that indicates that the affiliate member purchased the particular digital media item.

* * * * *